(12) United States Patent
Zhang et al.

(10) Patent No.: US 8,554,818 B2
(45) Date of Patent: *Oct. 8, 2013

(54) SIGNAL PROCESSING METHOD AND DATA PROCESSING METHOD AND APPARATUS

(75) Inventors: Deming Zhang, Shenzhen (CN); Haiting Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

This patent is subject to a terminal disclaimer.

(21) Appl. No.: 12/980,001

(22) Filed: Dec. 28, 2010

(65) Prior Publication Data

US 2011/0090993 A1    Apr. 21, 2011

Related U.S. Application Data

(63) Continuation of application No. PCT/CN2010/072029, filed on Apr. 22, 2010.

(30) Foreign Application Priority Data

Jun. 24, 2009  (CN) .......................... 2009 1 0150720

(51) Int. Cl.
*G06F 17/14*    (2006.01)
(52) U.S. Cl.
USPC .......................................... 708/400; 375/340
(58) Field of Classification Search
None
See application file for complete search history.

(56) References Cited

U.S. PATENT DOCUMENTS

| 4,231,102 | A | 10/1980 | Barr et al. |
| 5,327,367 | A | 7/1994 | Yamada |
| 6,167,102 | A * | 12/2000 | Hellberg ........................ 375/376 |
| 6,230,177 | B1 * | 5/2001 | Gossett et al. ................ 708/404 |
| 7,203,717 | B1 | 4/2007 | Absar et al. |
| 7,231,102 | B2 | 6/2007 | Ridgway |
| 7,496,505 | B2 | 2/2009 | Manjunath et al. |
| 7,685,220 | B2 | 3/2010 | Berkeman et al. |

(Continued)

FOREIGN PATENT DOCUMENTS

| CN | 1433169 A | 7/2003 |
| CN | 1464690 A | 12/2003 |

(Continued)

OTHER PUBLICATIONS

U.S. Appl. No. 13/086,183 (Dec. 22, 2011).

(Continued)

*Primary Examiner* — Michael D Yaary
(74) *Attorney, Agent, or Firm* — Leydig, Voit & Mayer, Ltd.

(57) ABSTRACT

The present invention discloses a signal processing method and a data processing method and apparatus. A time-domain to frequency-domain signal processing method includes: preprocessing time-domain data; pre-rotating the pre-processed data by using a rotation factor $a \cdot W_N^{n+0.5}$; performing a discrete Fourier transform (DFT) of N/4 points on the pre-rotated data; and post-rotating the data transformed by the DFT by using a rotation factor $b \cdot W_N^{k+0.5}$ to obtain frequency-domain data. A frequency-domain to time-domain signal processing method includes: twiddling frequency-domain data; pre-rotating the twiddled data by using a rotation factor $c \cdot W_N^{k+0.5}$; performing a DFT of N/4 points on the pre-rotated data; and post-rotating the data transformed by the DFT by using a rotation factor $d \cdot W_N^{n+0.5}$; and post-processing the post-rotated data to obtain time-domain data. The present invention increases the efficiency of signal processing.

13 Claims, 6 Drawing Sheets

(56) References Cited

U.S. PATENT DOCUMENTS

| | | | |
|---|---|---|---|
| 2002/0106020 A1 | 8/2002 | Cheng et al. | |
| 2006/0143258 A1 | 6/2006 | Teng et al. | |
| 2007/0050440 A1 | 3/2007 | Lee et al. | |
| 2007/0133389 A1 | 6/2007 | Berkeman et al. | |
| 2009/0094038 A1 | 4/2009 | Chivukula et al. | |

FOREIGN PATENT DOCUMENTS

| | | | |
|---|---|---|---|
| CN | 1719517 A | 1/2006 | |
| CN | 101266594 A | 9/2008 | |
| CN | 101425992 A | 5/2009 | |
| CN | 101562015 A | 10/2009 | |
| JP | 05324697 A | 12/1993 | |

OTHER PUBLICATIONS

Written Opinion of the International Searching Authority in corresponding PCT Application No. PCT/CN2010/072029 (Jul. 29, 2010).

$1^{st}$ Office Action in corresponding Chinese Application No. 201010213499.6 (Feb. 25, 2011).

International Search Report in corresponding PCT Application No. PCT/CN2010/072029 (Jul. 29, 2010).

Mo et al., "Fast Algorithm for DCT IV," Signal Processing, Jun. 1999, vol. 15, No. 2, Department of Electronics Engineering, Tsinghua University, Beijing, China.

Dou et al., "DSP-Based IMDCT Fast Algorithm," Department of Electronic Engineering, Tsinghua University, Beijing, China.

Dou et al., "One of the Fast DSP-based inverse MDCT algorithm," Department of Electronic Engineering, Tsinghua University, Beijing, China.

$2^{nd}$ Office Action in corresponding Chinese Application No. 201010213499.6 (Aug. 19, 2011).

$1^{st}$ Office Action in corresponding Chinese Application No. 200910150720.5 (Mar. 2, 2011).

$2^{nd}$ Office Action in corresponding Chinese Application No. 200910150720.5 (Aug. 19, 2011).

$1^{st}$ Office Action in corresponding Japanese Patent Application No. 2012-512184 (Mar. 5, 2013).

$3^{rd}$ Office Action in corresponding Chinese Patent Application No. 201010213499.6 (Apr. 2, 2013).

* cited by examiner

SIGNAL PROCESSING METHOD AND DATA PROCESSING METHOD AND APPARATUS

CROSS-REFERENCE TO RELATED APPLICATIONS

This application is a continuation of International Application No. PCT/CN2010/072029, filed on Apr. 22, 2010, which claims priority to Chinese Patent Application No. 200910150720.5, filed on Jun. 24, 2009, both of which are hereby incorporated by reference in their entireties.

FIELD OF THE INVENTION

The present invention relates to digital signal processing technologies, and in particular, to a signal processing method and a data processing method and apparatus.

BACKGROUND OF THE INVENTION

Orthogonal transforms as Fourier transform, discrete cosine transform (DCT), and discrete sine transform (DST) are widely used in digital signal processing, especially in spectrum analysis, image coding and speech coding.

A DCT is a spatial transform and has a strong energy compaction property so that a DCT-based coding system provides good compression performance.

A modified discrete cosine transform (MDCT) is a DCT-based improvement. The MDCT is designed to avoid blocking effect between consecutive blocks. It plays a vital role in wideband and super wideband digital audio coding.

A direct application of the forward MDCT and inverse MDCT according to the transform formula causes high complexity of computation. Especially, an MDCT on a large number of points cannot be performed in real time due to the high complexity of computation. Because of the wide application of the MDCT in real-time communications and especially in audio coding, a fast MDCT method becomes an urgent need.

The widely used FFT-based fast MDCT of N points includes the fast MDCT based on an N/2-point FFT and the fast MDCT based on an N/4-point FFT.

In the research and practice of the prior art, the following weaknesses are found:

In the application of a fast MDCT algorithm based on an N/4-point FFT, pre- and post-rotation processing requires the storing of at least cosine values of N/4 points and sine values of N/4 points, altogether N/2 values. When pre- and post-rotation steps are asymmetrical, N values need to be stored. In the case of a large N, the amount of additional storage is large, and therefore a lot of storage resources are consumed, and the transform efficiency is affected.

When a fast Fourier transform algorithm based on coprime factor is adopted, a lot of addressing operations are required and the algorithm does not take into account sequential access of the data sequence. The data obtained through a transform needs to be rearranged to obtain the final output data. Thus, the amount of computation is larger.

SUMMARY OF THE INVENTION

Embodiments of the present invention provide a signal processing method and a data processing method and apparatus to help improve the efficiency of signal processing.

A time-domain to frequency-domain signal processing method includes:

Pre-processing time-domain data;

pre-rotating the pre-processed data by using a rotation factor $a \cdot W_N^{n+0.5}$;

performing a discrete Fourier transform (DFT) of N/4 points on the pre-rotated data; and post-rotating the data transformed by the DFT by using a rotation factor $b \cdot W_N^{k+0.5}$ to obtain frequency-domain data; where:

a and b are constants, N is the length of the time-domain data, $$W_N = e^{-j\frac{2\pi}{N}}, W_N^{n+0.5} = e^{-j\frac{2\pi}{N}(n+0.5)}, W_N^{k+0.5} = e^{-j\frac{2\pi}{N}(k+0.5)},$$

and n and k are respectively all non-negative integers not larger than N/4.

A frequency-domain to time-domain signal processing method includes:

twiddling frequency-domain data;

pre-rotating the twiddled data by using a rotation factor $c \cdot W_N^{k+0.5}$;

performing a DFT of N/4 points on the pre-rotated data;

post-rotating the data transformed by the DFT by using a rotation factor $d \cdot W_N^{n+0.5}$; and post-processing the post-rotated data to obtain time-domain data; where:

c and d are constants, N is the double length of the frequency-domain data, $$W_N = e^{-j\frac{2\pi}{N}}, W_N^{n+0.5} = e^{-j\frac{2\pi}{N}(n+0.5)}, W_N^{k+0.5} = e^{-j\frac{2\pi}{N}(k+0.5)},$$

and n and k are respectively all non-negative integers not larger than N/4.

A data processing method includes:

performing P-point DFT on data for Q times based on the address table; and.

performing Q-point DFT on the data obtained after P-point DFT for Q times for P times based on the address table.

A time-domain to frequency-domain signal processing apparatus includes:

a pre-processing unit, configured to pre-process time-domain data;

a first pre-rotating unit, configured to pre-rotate the data obtained by the pre-processing unit by using a rotation factor $a \cdot W_N^{n+0.5}$;

a first Fourier transforming unit, configured to perform a DFT of N/4 points on the data processed by the first pre-rotating unit; and a first post-rotating unit, configured to post-rotate the data transformed by the first Fourier transforming unit by using a rotation factor $b \cdot W_N^{k+0.5}$ to obtain frequency-domain data, where $$W_N^{n+0.5} = e^{-j\frac{2\pi}{N}(n+0.5)}, W_N^{k+0.5} = e^{-j\frac{2\pi}{N}(k+0.5)},$$

and n and k are respectively all non-negative integers not larger than N/4.

A frequency-domain to time-domain signal processing apparatus includes:

a twiddling unit, configured to twiddle frequency-domain data;

a second pre-rotating unit, configured to pre-rotate the data obtained by the twiddling unit by using a rotation factor $c \cdot W_N^{k+0.5}$.

a second Fourier transforming unit, configured to perform a DFT of N/4 points on the data processed by the second pre-rotating unit;

a third post-rotating unit, configured to post-rotate the data transformed by the second Fourier transforming unit by using a rotation factor $d \cdot W_N^{n+0.5}$; and a post-processing unit, configured to post-process the data processed by the third post-rotating unit to obtain time-domain data where $$W_N^{n+0.5} = e^{-j\frac{2\pi}{N}(n+0.5)}, \quad W_N^{k+0.5} = e^{-j\frac{2\pi}{N}(k+0.5)},$$

and n and k are respectively all non-negative integers not larger than N/4.

A data processing apparatus includes:

an address table unit, configured to create or store an address table;

a fifth transforming unit, configured to perform P-point DFT on data for Q times based on the address table created or stored by the address table unit; and a sixth transforming unit, configured to perform Q-point DFT on the data transformed by the fifth transforming unit for P times based on the address table created or stored by the address table unit.

In the above technical solution, the rotation factors adopted by the signal processing methods provided in the embodiments of the present invention are products of a constant and $W_N^{n+0.5}$. Because $W_N^{n+0.5}$ symmetrical, it is only necessary to store a data table of N/4 points to complete the pre-rotation and post-rotation. Compared with the prior art, the signal processing methods provided in the embodiments of the present invention reduce the amount of storage, reduce the consumption of storage resources and increase the transform efficiency. Further, the signal processing methods in the embodiments of the present invention do not require a normalization factor when the post-rotation is performed so that related processing steps are spared and therefore the transform efficiency is further improved.

BRIEF DESCRIPTION OF THE DRAWINGS

To better explain the technical solution of the embodiments of the present invention or the prior art, the drawings required in the description of the embodiments of the present invention or the prior art will be described in brief. It is apparent that the drawings described below are only some embodiments of the present invention. Those skilled in the art can obtain other drawings based on the drawings without creative work.

DETAILED DESCRIPTION OF THE INVENTION

Figure 1:
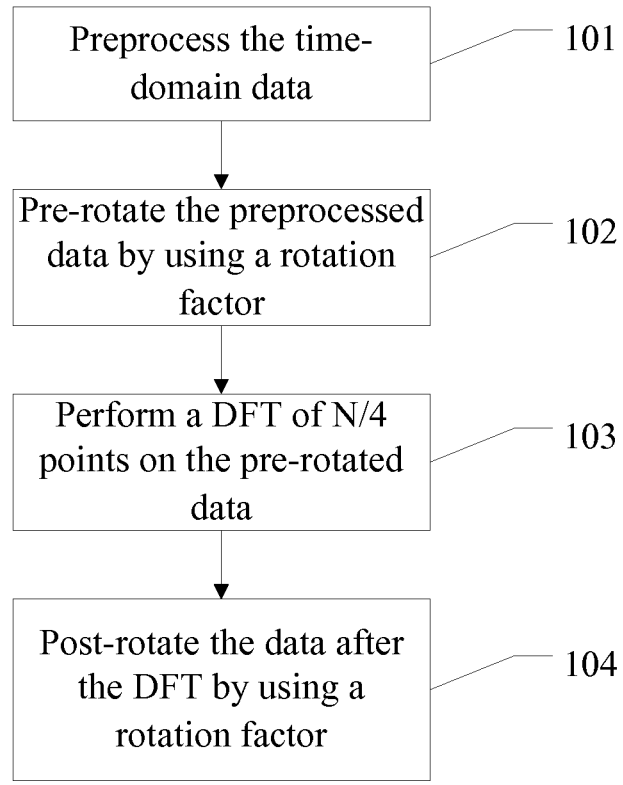
FIG. 1 is a flowchart of a time-domain to frequency-domain signal processing method in a first embodiment of the present invention.

The technical solution of the present invention is hereinafter described in detail with reference to the accompanying drawings. It is evident that the embodiments are exemplary only and the present invention is not limited to such embodiments. Other embodiments that those skilled in the art obtain based on the embodiments of the present invention also fall within the scope of protection of the present invention.

The embodiments of the present invention provide a signal processing method and a data processing method and apparatus to help improve the efficiency of signal processing.

In the prior art, to achieve a fast MDCT based on the FFT of N/4 points, the data of N points is first windowed, twiddled and pre-rotated so that an MDCT of N points is changed to an FFT of N/4 points. Data obtained through the FFT operation is post-rotated to obtain a final MDCT coefficient.

The definition of the MDCT is:

$$X_k = A \sum_{n=0}^{N-1} y_n \cos\left[\frac{2\pi}{N}\left(n + \frac{1}{2} + \frac{N}{4}\right)\left(k + \frac{1}{2}\right)\right] \quad k = 0, 1, \Lambda, \frac{N}{2} - 1$$

where, A is a normalization factor and a constant.

According to the definition of the MDCT, the following can be obtained:

$$X_{2k} = A \cdot \mathrm{Re}\left\{ W_n^{k+0.125} \sum_{n=0}^{\frac{N}{4}-1} u_n W_N^{n+0.125} W_{\frac{N}{4}}^{nk} \right\} \quad k = 0, \Lambda, \frac{N}{4} - 1$$

$$X_{\frac{N}{2}-1-2k} = -A \cdot \mathrm{Im}\left\{ W_n^{k+0.125} \sum_{n=0}^{\frac{N}{4}-1} u_n W_N^{n+0.125} W_{\frac{N}{4}}^{nk} \right\}$$

$k = 0, \Lambda, \frac{N}{4} - 1$ where $W_N^x = e^{-j\frac{2\pi x}{N}}$.

The two equations can be combined to obtain the following equation:

$$X_{2k} - jX_{\frac{N}{2}-1-2k} = A \cdot \overbrace{W_N^{k+0.125}}^{post-rotation} \sum_{n=0}^{\frac{N}{4}-1} \left\{ u_n \overbrace{W_N^{n+0.125}}^{pre-rotation} \right\} \overbrace{W_{\frac{N}{4}}^{nk}}^{\frac{N}{4} point\ sDFT}$$

-continued $$k = 0, \Lambda, \frac{N}{4} - 1$$

Then, the forward MDCT based on the N/4-point FFT includes the following steps:

1. Windowing:

$$y_n = h_n x_n \; n=0, \Lambda, N-1$$

$h_n$ is a window function that satisfies the perfect reconstruction condition but unnecessarily a symmetrical window. That is, analysis and synthesis may use different windows so long as the analysis window and synthesis window can together achieve a perfect reconstruction. $x_n$ is the input data. Normally, $x_{0 \sim N/2-1}$ is data of the cached previous frame and $x_{N/2 \sim N-1}$ is data of the current frame.

2. Twiddling:

$$u_n = \left(z_{2n} + j z_{\frac{N}{2}-1-2n}\right) \; n = 0, \Lambda, \frac{N}{4} - 1$$

where:

$$\begin{cases} z_{n+\frac{N}{4}} = y_n - y_{\frac{N}{2}-1-n} \\ z_{\frac{N}{4}-1-n} = -y_{N-1-n} - y_{\frac{N}{2}+n} \end{cases} n = 0, \Lambda, \frac{N}{4} - 1$$

or, $$\begin{cases} z_n = -y_{n+\frac{3N}{4}} - y_{\frac{3N}{4}-1-n} & n = 0, \Lambda, \frac{N}{4} - 1 \\ z_n = y_{n-\frac{N}{4}} - y_{\frac{3N}{4}-1-n} & n = \frac{N}{4}, \Lambda, \frac{N}{2} - 1 \end{cases}$$

3. Pre-rotate $u_n$ by using the rotation factor $W_N^{n+0.125}$.

4. Perform an N/4-point FFT on the rotated data.

5. Post-rotate the transformed data by using the rotation factor $W_N^{k+0.125}$ and the normalization factor A.

6. The real part of the complex number obtained through the post-rotation is $X_{2k}$ which denotes the odd frequencies of the MDCT spectrum and the imaginary part is $-X_{N/2-1-2k}$ which denotes the even frequencies of the MDCT spectrum.

The rotation factor $W_N^{n+0.125}$ may be expanded to:

$$W_N^{n+0.125} = e^{-j\frac{2\pi}{N}(n+0.125)} = \cos\left(\frac{2\pi(n+0.125)}{N}\right) - j\sin\left(\frac{2\pi(n+0.125)}{N}\right)$$

Rotation factors $W_N^{n+0.125}$ and $W_N^{k+0.125}$ are required for pre-rotation and post-rotation processing and therefore at least cosine values of N/4 points and sine values of N/4 points, altogether N/2 values, need to be stored. When pre- and post-rotation steps are asymmetrical, N values need to be stored. In the case of a large N, the amount of additional storage is large and therefore a lost of storage resources are consumed and the transform efficiency is affected.

A time-domain to frequency-domain signal processing method provided in an embodiment of the present invention includes:

1. Pre-process the time-domain data.
2. Pre-rotate the pre-processed data by using the rotation factor $a \cdot W_N^{n+0.5}$.
3. Perform a DFT of N/4 points on the pre-rotated data.

Post-rotate the data after the DFT by using the rotation factor $b \cdot W_N^{k+0.5}$ to obtain the frequency-domain data, where, a and b are constants, N is the length of the time-domain data, n=0, Λ, N/4−1, k=0, Λ, n/4−1, and $$W_N = e^{-j\frac{2\pi}{N}}.$$

All processing on the data before the pre-rotation may be described as pre-processing. In this embodiment, for example, pre-processing may be windowing and twiddling or only twiddling.

A frequency-domain to time-domain signal processing method provided in an embodiment of the present invention includes:

1. Twiddle the frequency-domain data.
2. Pre-rotate the twiddled data by using the rotation factor $c \cdot W_N^{k+0.5}$.
3. Perform a DFT of N/4 points on the pre-rotated data.
4. Post-rotate the data after the DFT by using the rotation factor $d \cdot W_N^{n+0.5}$.
5. Post-process the post-rotated data to obtain the time-domain data.

where, c and d are constants, N is twice the length of the frequency-domain data, n=0, Λ, N/4−1, k=0, Λ, N/4−1, and $$W_N = e^{-j\frac{2\pi}{N}}.$$

All processing on the data after the post-rotation may be described as post-processing. The content of post-processing depends on the content of pre-processing in the corresponding time-domain to frequency-domain signal processing method. In this embodiment, for example, if the pre-processing is windowing and twiddling, the post-processing is also windowing and twiddling; if the pre-processing is just twiddling, the post-processing is also just twiddling.

The time-domain to frequency-domain signal processing may also be called a forward transform and the frequency-domain to time-domain signal processing may also be called an inverse transform. When a×b×c×d=4/N in the forward transform and the inverse transform, using the output data of the forward transform as the input data of the inverse transform, a perfect reconstruction can be achieved, because the result of the inverse transform can recover the data before the forward transform. In practice, the perfect reconstruction is unnecessarily required.

$W_N^{n+0.5}$ in the rotation factor adopted by the signal processing method provided in an embodiment of the present invention may be expanded to:

$$W_N^{n+0.5} = e^{-j\frac{2\pi}{N}(n+0.5)} = \cos\left(\frac{2\pi(n+0.5)}{N}\right) - j\sin\left(\frac{2\pi(n+0.5)}{N}\right)$$

where, $$\cos\left(\frac{2\pi}{N}(n+0.5)\right) = \sin\left(\frac{2\pi}{N}\left(\frac{N}{4} - 1 - n + 0.5\right)\right);$$

$$\sin\left(\frac{2\pi}{N}(n+0.5)\right) = \cos\left(\frac{2\pi}{N}\left(\frac{N}{4} - 1 - n + 0.5\right)\right);$$

From $$\cos\left(\frac{2\pi}{N}(n+0.5)\right) = \sin\left(\frac{2\pi}{N}\left(\frac{N}{4}-1-n+0.5\right)\right),$$

one can know that n+(N/4−1−n)=N/4−1; as n=0, L, N/4−1 and k=0, L, N/4−1, the first value of $$\cos\left(\frac{2\pi}{N}(n+0.5)\right)$$

(when n=0) equals the last value of $$\sin\left(\frac{2\pi}{N}(n+0.5)\right)$$

(when n=N/4−1). The second value of $$\cos\left(\frac{2\pi}{N}(n+0.5)\right)$$

(when n=1) equals the next to last value of $$\sin\left(\frac{2\pi}{N}(n+0.5)\right)$$

(when N/4−2) and so on.

Therefore, $W_N^{n+0.5}$ is symmetrical. It is only necessary to store any N/4 points data table of $$\cos\left(\frac{2\pi}{N}(n+0.5)\right) \text{ or } \sin\left(\frac{2\pi}{N}(n+0.5)\right)$$

to complete the pre-rotation and post-rotation.

In the traditional MDCT, to obtain the MDCT spectrum coefficient, the rotation factors $W_N^{n+0.125}$ and $W_N^{k+0.125}$ need to be adopted and $W_N^{n+0.125}$ and $W_N^{k+0.125}$ are not symmetrical. Therefore, at least cosine values of N/4 points and sine values of N/4 points need to be stored during pre-rotation and post-rotation. The rotation factor adopted by the signal processing method provided in the embodiment of the present invention is the product of a constant and $W_N^{n+0.5}$. Because $W_N^{n+0.5}$ is symmetrical, it is only necessary to store a data table of N/4 points to complete the pre-rotation and post-rotation. Compared with the prior art, the signal processing method in the embodiment of the present invention significantly reduces the amount of storage and the consumption of storage resources, and increases the transform efficiency. Further, the signal processing method in the embodiment of the present invention does not require a normalization factor so that related processing steps are spared and therefore the transform efficiency is further improved.

Exemplary embodiments of the signal processing method of the present invention will be described. FIG. 1 is a flowchart of the time-domain to frequency-domain signal processing method in a first embodiment of the present invention. The method includes the following steps:

101. Pre-process the time-domain data.

In this step, pre-processing includes windowing and twiddling. In practice, other pre-processing means may be adopted.

Assume the time-domain data $x_n$ is the input data. Normally, $x_{0 \sim N/2-1}$ is the cached previous frame data and $x_{N/2 \sim N-1}$ is the current frame data. N is the length of the time-domain data, and may be 1280 in this embodiment. The data is first windowed:

$$y_n = h_n x_n, n=0, \Lambda, N-1,$$

$h_n$ is a window function that satisfies the perfect reconstruction condition and may be referred to as an analysis window function. The window function used in the inverse transform may be called a synthesis window function. The analysis window function may be different from the synthesis window function so long as the analysis window function and the synthesis window function can complete the perfect reconstruction together. The windowed data is twiddled and the twiddled data $u_n$ satisfies:

$$u_n = \left(z_{2n} + jz_{\frac{N}{2}-1-2n}\right) \quad n=0, \Lambda, \frac{N}{4}-1$$

where:

$$\begin{cases} z_{n+\frac{N}{4}} = y_n - y_{\frac{N}{2}-1-n} \\ z_{\frac{N}{4}-1-n} = -y_{N-1-n} - y_{\frac{N}{2}+n} \end{cases} \quad n=0, \Lambda, \frac{N}{4}-1$$

or, $$\begin{cases} z_n = -y_{n+\frac{3N}{4}} - y_{\frac{3N}{4}-1-n} & n=0, \Lambda, \frac{N}{4}-1 \\ z_n = y_{n-\frac{N}{4}} - y_{\frac{3N}{4}-1-n} & n=\frac{N}{4}, \Lambda, \frac{N}{2}-1 \end{cases}$$

102. Pre-rotate the pre-processed data by using the rotation factor $a \cdot W_N^{n+0.5}$.

The twiddled data $u_n$ is pre-rotated by using the rotation factor $a \cdot W_N^{n+0.5}$, n=0, L, N/4−1 where, $$W_N = e^{-j\frac{2\pi}{N}} = \cos\left(\frac{2\pi}{N}\right) - j\sin\left(\frac{2\pi}{N}\right)$$

and a is a constant.

The data obtained after the rotation is $a \cdot W_N^{n+0.5} \cdot u_n$.

In this embodiment, the constant may be $$a = \frac{\sqrt{2}}{\sqrt[4]{N}}.$$

Because $W_N^{n+0.5}$ in the rotation factor may be expressed in the following form:

$$W_N^{n+0.5} = e^{-j\frac{2\pi}{N}(n+0.5)} = \cos\left(\frac{2\pi(n+0.5)}{N}\right) - j\sin\left(\frac{2\pi(n+0.5)}{N}\right),$$

which satisfies $$\cos\left(\frac{2\pi}{N}(n+0.5)\right) = \sin\left(\frac{2\pi}{N}\left(\frac{N}{4}-1-n+0.5\right)\right)$$

and $$\sin\left(\frac{2\pi}{N}(n+0.5)\right) = \cos\left(\frac{2\pi}{N}\left(\frac{N}{4}-1-n+0.5\right)\right),$$

only a sine or cosine data table of N/4 points is required in the implementation of the method. In this embodiment, a data table of only N/4 points is stored. Values in the data table are expressed by $$\frac{1}{\sqrt[4]{320}}\cos\left(\frac{2\pi}{N}(n+0.5)\right), n = 0, \Lambda, 319.$$

103. Perform a DFT of N/4 points on the pre-rotated data.

In this step, a common DFT of N/4 points may be used or other N/4-point FFTs may be used.

Further, in step 103, an FFT based on an address table may be used when M=N/4=P×Q, where P and Q are positive integers and P and Q are coprime and the length of the address table is M.

Figure 2:
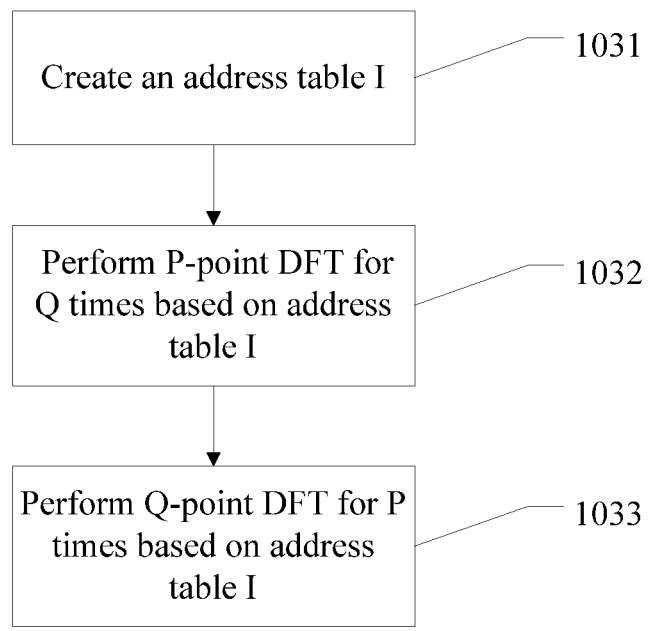
FIG. 2 is a flowchart of a data processing method that adopts an address table for FFT operations in an embodiment of the present invention.

FIG. 2 is a flowchart of the data processing method that adopts an address table for the FFT in an embodiment of the present invention. The method includes the following steps:

1031. Create an address table I. The address table I satisfies:

$$I = <K_1 \times n_1 + K_2 \times n_2>_M \, n_1 = 0, \Lambda, P-1$$

$$n_2 = 0, \Lambda, Q-1$$

$K_1$ and $K_2$ are coprime positive integers that satisfy $<K_1 K_2>_M = 0$, where $K_1 K_2 = Z$ and $<Z>_M$ means Z modulo M, which is the remainder of division of Z by M. This step may be performed earlier and has no sequential relation with step 101 or 102. That is, address table I may be calculated and stored in advance. Addresses stored in address table I need to traverse 0, 1, ..., M−1 to form a one-to-one mapping with the input data so as to determine the sequential relations of the data. When address table I satisfies the one-to-one mapping, the following three conditions need to be met:

(1) $K_1$ is a positive integral multiple of Q and/or $K_2$ is a positive integral multiple of P.

(2) $K_1$ and P are coprime.

(3) $K_2$ and Q are coprime.

Assuming P=64, Q=5, $K_1$=65, $K_2$=256, and M=N/4=320, address table I may be expressed by:

$$I = <65n_1 + 256n_2>_{320}$$

where, $n_1=0, L, 63$ and $n_2=0, L, 4$.

Address table I may be stored in a table in the form of arrays, such as one-dimensional arrays of $I[n_2 \times n_1]$ or two-dimensional arrays of $I[n_1][n_2]$.

Assuming that address table I is the address table of M=320 points, $K_1$=65, $K_2$=256, Q=5, P=64, and Q×P=5×64 points; if address table I is stored as one-dimensional arrays of $I[n_2 \times n_1]$:

Idx[Q×P]=
{0,65,130,195,260,5,70,135,200,265,10,75,140,205,270,
15,80,145,210,275,20,85,150,215,280,25,90,155,220,285,
30,95,160,225,290,35,100,165,230,295,40,105,170,235,
300,45,110,175,240,305,50,115,180,245,310,55,120,185,
250,315,60,125,190,255,
256,1,66,131,196,261,6,71,136,201,266,11,76,141,206,
271,16,81,146,211,276,21,86,151,216,281,26,91,156,221,
286,31,96,161,226,291,36,101,166,231,296,41,106,171,
236,301,46,111,176,241,306,51,116,181,246,311,56,121,
186,251,316,61,126,191,
192,257,2,67,132,197,262,7,72,137,202,267,12,77,142,
207,272,17,82,147,212,277,22,87,152,217,282,27,92,157,
222,287,32,97,162,227,292,37,102,167,232,297,42,107,
172,237,302,47,112,177,242,307,52,117,182,247,312,57,
122,187,252,317,62,127,
128,193,258,3,68,133,198,263,8,73,138,203,268,13,78,
143,208,273,18,83,148,213,278,23,88,153,218,283,28,93,
158,223,288,33,98,163,228,293,38,103,168,233,298,43,
108,173,238,303,48,113,178,243,308,53,118,183,248,313,
58,123,188,253,318,63,
64,129,194,259,4,69,134,199,264,9,74,139,204,269,14,
79,144,209,274,19,84,149,214,279,24,89,154,219,284,29,
94,159,224,289,34,99,164,229,294,39,104,169,234,299,
44,109,174,239,304,49,114,179,244,309,54,119,184,249,
314,59,124,189,254,319};

If address table I is stored as two-dimensional arrays of $I[n_1][n_2]$:

Idx[Q][P]=
{{0,65,130,195,260,5,70,135,200,265,10,75,140,205,
270,15,80,145,210,275,20,85,150,215,280,25,90,155,220,
285,30,95,160,225,290,35,100,165,230,295,40,105,170,
235,300,45,110,175,240,305,50,115,180,245,310,55,120,
185,250,315,60,125,190,255},
{256,1,66,131,196,261,6,71,136,201,266,11,76,141,206,
271,16,81,146,211,276,21,86,151,216,281,26,91,156,221,
286,31,96,161,226,291,36,101,166,231,296,41,106,171,
236,301,46,111,176,241,306,51,116,181,246,311,56,121,
186,251,316,61,126,191},
{192,257,2,67,132,197,262,7,72,137,202,267,12,77,142,
207,272,17,82,147,212,277,22,87,152,217,282,27,92,157,
222,287,32,97,162,227,292,37,102,167,232,297,42,107,
172,237,302,47,112,177,242,307,52,117,182,247,312,57,
122,187,252,317,62,127},
{128,193,258,3,68,133,198,263,8,73,138,203,268,13,
78,143,208,273,18,83,148,213,278,23,88,153,218,283,28,
93,158,223,288,33,98,163,228,293,38,103,168,233,298,43,
108,173,238,303,48,113,178,243,308,53,118,183,248,313,
58,123,188,253,318,63},
{64,129,194,259,4,69,134,199,264,9,74,139,204,269,14,
79,144,209,274,19,84,149,214,279,24,89,154,219,284,29,
94,159,224,289,34,99,164,229,294,39,104,169,234,299,44,
109,174,239,304,49,114,179,244,309,54,119,184,249,314,
59,124,189,254,319};

1032. Perform P-point DFT for Q times based on address table I.

The input data of the $i^{th}$ (i=0, Λ, Q−1) P-point DFT is the data associated with the P address indexes corresponding to $n_2=i$, and $n_1=0, \Lambda, P-1$ in address table I. The result of the $i^{th}$ P-point DFT need to be applied a circular shift with a step of x to obtain the final output.

Here, x is the inverse of a cyclic modulus of $$\left(\frac{K_1^2}{Q}\right)_P$$

over P and satisfies $$\left(x \cdot \left(\frac{K_1^2}{Q}\right)_P\right)_P = 1.$$

If address table I is stored in the form of one-dimensional arrays of I[$n_2 \times n_1$], the P-point DFT for Q times based on address table I may be expressed by:

DFT_$P(z(I+iP))_x$ $i=0,\Lambda,Q-1$

The input data of each P-point DFT is the data corresponding to the P continuous indexes staring from I+iP. The result of each P-point DFT is applied a circular shift with a step of x.

In this embodiment, 64-point DFT are performed for five times. The input data of the $i^{th}$ (i=0, Λ4) 64-point DFT is that associated with the 64 continuous address indexes starting from the address table array I[64i](data after rotation). The result of the $i^{th}$ 64-point DFT is applied a circular shift with a step of five. For example, the result of circular shift with a step of two on the vector Z=[$z_0$ $z_1$ $z_2$ $z_3$ $z_4$] is Z=[$z_0$ $z_2$ $z_4$ $z_1$ $z_3$]. In addition, to further increase the efficiency of computation, the FFT may be used in stead of the DFT.

1033. Perform Q-point DFT for P times based on address table I.

The input data of the $i^{th}$ (i=0, Λ, P−1) Q-point DFT is the data associated with the Q address indexes corresponding to $n_1$=i, $n_2$=0, Λ, Q−1 in address table I. The result of the $i^{th}$ Q-point DFT need to be applied a circular shift with a step of y to obtain the final output.

Here, y is the inverse of a cyclic modulus of $$\left(\frac{K_2^2}{P}\right)_Q$$

over Q and satisfies $$\left\{y \cdot \left(\frac{K_2^2}{P}\right)_Q\right\}_Q = 1.$$

If address table I is stored in the form of one-dimensional arrays of I[$n_2 \times n_1$], the Q-point DFT for P times based on address table I may be expressed by:

DFT_$Q(z(I+i))_y$ $i=0,\Lambda,P-1$;

The input data of each Q-point DFT is that corresponding to the Q indexes starting from I+i in table I each of which are separated by a step of P. The result of each Q-point DFT is applied a circular shift with a step of y.

In this embodiment, 5-point DFT are performed for 65 times. The input data of the $i^{th}$ (i=0, Λ63) 5-point DFT is that associated with the 5 address indexes starting from the address table array I[i] (data after rotation) each of which are separated by a step of 64. The $i^{th}$ 5-point DFT is applied a circular shift with a step of four.

In the prior art, most DFTs based on coprime factor do not take into account the sequential access of the data sequence. The data obtained through a transform needs to be rearranged to obtain the final output data. Thus, the amount of computation is larger. In this embodiment, an address table is adopted in a DFT, where addressing is based on the address table, the input data is read according to the associated addresses in the address table and the output data is stored according to the associated addresses in the address table. The sequence of the data obtained after a transform is ready without any special rearrangement. Thus, the complexity of computation is reduced and efficiency of computation is higher.

104. Post-rotate the data after the DFT by using the rotation factor $b \cdot W_N^{k+0.5}$ to obtain the frequency-domain data.

The transformed data is post-rotated by using the rotation factor $b \cdot W_N^{k+0.5}$, k=0, L, N/4−1, where $$W_N = e^{-j\frac{2\pi}{N}} = \cos\left(\frac{2\pi}{N}\right) - j\sin\left(\frac{2\pi}{N}\right)$$

and b is a constant. In this embodiment, the constant may be $$b = \frac{\sqrt{2}}{\sqrt[4]{N}}.$$

Because $W_N^{k+0.5}$ in the rotation factor may be expressed in the following form:

$$W_N^{k+0.5} = e^{-j\frac{2\pi}{N}(k+0.5)} = \cos\left(\frac{2\pi(k+0.5)}{N}\right) - j\sin\left(\frac{2\pi(k+0.5)}{N}\right),$$

$$k = 0, \Lambda, \frac{N}{4} - 1$$

and b=a, the N/4-point data table used in step 102 may be reused in the implementation of the step.

The frequency-domain data, also the final spectrum, is $X_k$, k=0, Λ, N/4−1 and may be expressed by:

$$X_{2k} = \text{Re}\left\{b \cdot W_N^{k+0.5} \sum_{n=0}^{\frac{N}{4}-1} u_n \cdot a \cdot W_N^{n+0.5} W_{\frac{N}{4}}^{nk}\right\} \quad k = 0, \Lambda, \frac{N}{4} - 1$$

$$X_{\frac{N}{2}-1-2k} = -\text{Im}\left\{b \cdot W_N^{k+0.5} \sum_{n=0}^{\frac{N}{4}-1} u_n \cdot a \cdot W_N^{n+0.5} W_{\frac{N}{4}}^{nk}\right\} \quad k = 0, \Lambda, \frac{N}{4} - 1$$

According to the time-domain to frequency-domain signal processing method in the first embodiment of the present invention, a frequency-domain to time-domain signal processing method is provided in the second embodiment of the present invention. If a forward transform is performed by using the time-domain to frequency-domain signal processing method provided in the first embodiment of the present invention, a corresponding inverse transform may be performed by using the frequency-domain to time-domain signal processing method provided in the second embodiment of the present invention.

Figure 3:
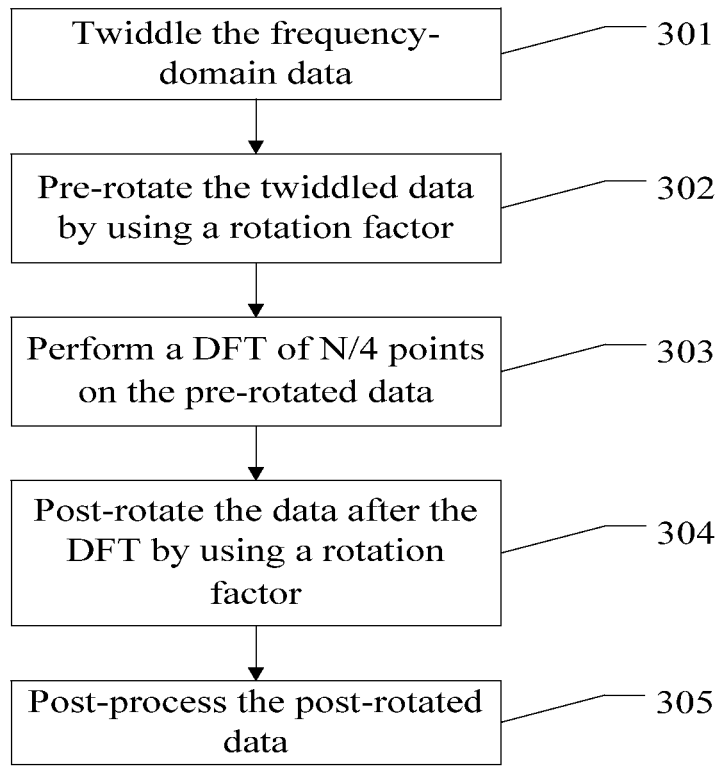
FIG. 3 is a flowchart of a frequency-domain to time-domain signal processing method in a second embodiment of the present invention.

FIG. 3 is a flowchart of the frequency-domain to time-domain signal processing method in the second embodiment of the present invention. The method includes the following steps:

301. Twiddle the frequency-domain data.

Specifically, the frequency-domain data $X_k$, k=0, Λ, N/2−1 is twiddled. In this embodiment, N=1280.

An intermediate variable obtained after the twiddling is ($X_{2k}+jX_{N/2-1-2k}$), k=0, Λ, N−1.

302. Pre-rotate the twiddled data by using the rotation factor $c \cdot W_N^{k+0.5}$.

The twiddled data is pre-rotated by using the rotation factor $c \cdot W_N^{k+0.5}$, k=0, Λ, N/4−1.

where, $$W_N = e^{-j\frac{2\pi}{N}} = \cos\left(\frac{2\pi}{N}\right) - j\sin\left(\frac{2\pi}{N}\right)$$

and c is a constant.

In this embodiment, the constant may be $$c = \frac{\sqrt{2}}{\sqrt[4]{N}}$$

and therefore the N/4-point data table used in steps 102 and 104 may also be reused in this step.

303. Perform a DFT of N/4 points on the pre-rotated data.

In this step, a common DFT of N/4 points may be used or other N/4-point FFTs may be used.

In this step, a 320-point FFT shown in FIG. 2 may be performed.

304. Post-rotate the data after the DFT by using the rotation factor $d \cdot W_N^{n+0.5}$.

The transformed data is post-rotated by using the rotation factor $d \cdot W_N^{n+0.5}$, n=0, Λ, N/4−1, where, $$W_N = e^{-j\frac{2\pi}{N}} = \cos\left(\frac{2\pi}{N}\right) - j\sin\left(\frac{2\pi}{N}\right)$$

and d is a constant.

In this embodiment, the constant may be $$d = \frac{\sqrt{2}}{\sqrt[4]{N}}$$

and therefore the N/4-point data table used in steps 102 and 104 may also be reused in this step.

The data obtained after the above processing is $y_n$:

$$y_n = \begin{cases} (-j) \cdot d \cdot W_N^{n+0.5} \sum_{k=0}^{\frac{N}{4}-1}\left[\left(X_{2k} + jX_{\frac{N}{2}-1-2k}\right) \cdot c \cdot W_N^{k+0.5}\right]W_{\frac{N}{4}}^{nk} \\ \quad n = 0, \Lambda, \frac{N}{8}-1 \\ d \cdot W_N^{n+0.5} \sum_{k=0}^{\frac{N}{4}-1}\left[\left(X_{2k} + jX_{\frac{N}{2}-1-2k}\right) \cdot c \cdot W_N^{k+0.5}\right]W_{\frac{N}{4}}^{nk} \\ \quad n = \frac{N}{8}, \Lambda, \frac{N}{4}-1 \end{cases}$$

305. Post-process the post-rotated data to obtain the time-domain data.

In this step, post-processing includes windowing and twiddling. In practice, other post-processing means may be adopted.

After windowing and twiddling, the time-domain data $\hat{x}_n$, n=0, Λ, N/4−1 is obtained.

$$\begin{cases} \hat{x}_{2n} = m_{2n}g_{\frac{N}{2}+2n} + \text{Re}\{u_n\}g_{2n} \\ \hat{x}_{\frac{N}{2}-1-2n} = m_{\frac{N}{2}-1-2n}g_{N-1-2n} - \text{Re}\{u_n\}g_{\frac{N}{2}-1-2n} \end{cases} n = 0, \Lambda, \frac{N}{4}-1$$

where, $$\begin{cases} u_n = y_{n+\frac{N}{8}} \\ u_{n+\frac{N}{8}} = y_n \end{cases} n = 0, \Lambda, \frac{N}{8}-1,$$

and $g_n$ is a synthesis window, which satisfies the perfect reconstruction condition together with the analysis window $h_n$, that is, $h_n g_n + h_{n+N/2} g_{n+N/2} = 1$, n=0, Λ, N−N/2−1. $m_n$ is the buffered data of the previous frame and the update of $m_n$ satisfies:

$$\begin{cases} m_{\frac{N}{4}-1-2n} = m_{\frac{N}{4}+2n} = \text{Im}\{u_n\} & n = 0, \Lambda, \frac{N}{8}-1 \\ m_{2n-\frac{N}{4}} = m_{\frac{3N}{4}-1-2n} = \text{Im}\{u_n\} & n = \frac{N}{8}, \Lambda, \frac{N}{4}-1 \end{cases}$$

When the time-domain to frequency-domain signal processing method provided in the first embodiment of the present invention and the frequency-domain to time-domain signal processing method provided in the second embodiment of the present invention are used, if the constants a, b, c, and d in the forward transform and the inverse transform satisfy a×b×c×d=4/N, the result of the inverse transform is ready for a perfect reconstruction. In practice, the perfect reconstruction is unnecessarily required.

For example, one can choose $$a = b = c = d = \frac{\sqrt{2}}{\sqrt[4]{N}}.$$

Then, the forward transform and the inverse transform require only storage of any N/4-point data table in $$\frac{\sqrt{2}}{\sqrt[4]{N}}\cos\left(\frac{2\pi}{N}(n+0.5)\right) \text{ and } \frac{\sqrt{2}}{\sqrt[4]{N}}\sin\left(\frac{2\pi}{N}(n+0.5)\right)$$

to complete the pre-rotation and post-rotation. If the constants a, b, c, and d are not equal, an appropriate data table needs to be stored according to the practical conditions to complete the pre-rotation and post-rotation.

Another time-domain to frequency-domain signal processing method provided in an embodiment of the present invention includes:

1. Pre-process the time-domain data.
2. Pre-rotate the pre-processed data by using the rotation factor $a \cdot W_N^{n+0.5}$.
3. Perform a DFT of N/4 points on the pre-rotated data.
4. Post-rotate the data after the DFT by using the rotation factor $b \cdot W_N^{k+0.5}$ and normalization factor A to obtain the frequency-domain data, where, a and b are constants, N is the length of the time-domain data, n=0, . . . , N/4−1, k=0, . . . , N/4−1, and $W_N = e^{-j2\pi/N}$.

All processing on the data before the pre-rotation may be described as pre-processing. In this embodiment, for example, pre-processing may be windowing and twiddling or only twiddling.

Another frequency-domain to time-domain signal processing method provided in an embodiment of the present invention includes:

1. Twiddle the frequency-domain data.
2. Pre-rotate the twiddled data by using the rotation factor $c \cdot W_N^{k+0.5}$.
3. Perform a DFT of N/4 points on the pre-rotated data.
4. Post-rotate the data after the DFT by using the rotation factor $d \cdot W_N^{n+0.5}$ and the normalization factor B.
5. Post-process the post-rotated data to obtain the time-domain data, where, c and d are constants, N is twice the length of the frequency-domain data, n=0, L, N/4−1, k=0, L, N/4−1, $$W_N = e^{-j\frac{2\pi}{N}}.$$

All processing on the data after the post-rotation may be described as post-processing. The content of post-processing depends on the content of pre-processing in the corresponding time-domain to frequency-domain signal processing method. In this embodiment, for example, if the pre-processing is windowing and twiddling, the post-processing is also windowing and twiddling; if the pre-processing is twiddling, the post-processing is also twiddling.

The time-domain to frequency-domain signal processing is also called a forward transform and the frequency-domain to time-domain signal processing is also called an inverse transform. When a×b×c×d=4/N in the forward transform and the inverse transform, using the output data of the forward transform as the input data of the inverse transform, A perfect reconstruction can be achieved, because the result of the inverse transform can recover the data before the forward transform. For example, one may choose a=b=c=d=1, A·B=4/N, or $$a = b = c = d = \frac{\sqrt{2}}{\sqrt[4]{N}},$$

A=B=1. In practice, the perfect reconstruction is unnecessarily required.

$W_N^{n+0.5}$ in the rotation factor adopted by the signal processing method provided in this embodiment may be expanded to:

$$W_N^{n+0.5} = e^{-j\frac{2\pi}{N}(n+0.5)} = \cos\left(\frac{2\pi(n+0.5)}{N}\right) - j\sin\left(\frac{2\pi(n+0.5)}{N}\right)$$

where, $$\cos\left(\frac{2\pi}{N}(n+0.5)\right) = \sin\left(\frac{2\pi}{N}\left(\frac{N}{4}-1-n+0.5\right)\right);$$

$$\sin\left(\frac{2\pi}{N}(n+0.5)\right) = \cos\left(\frac{2\pi}{N}\left(\frac{N}{4}-1-n+0.5\right)\right);$$

Therefore, $W_N^{n+0.5}$ is symmetrical. It is only necessary to store any N/4 points data table of $$\cos\left(\frac{2\pi}{N}(n+0.5)\right) \text{ or } \sin\left(\frac{2\pi}{N}(n+0.5)\right)$$

to complete the pre-rotation and post-rotation.

In the traditional MDCT, to obtain the MDCT spectrum coefficients, the rotation factor $W_N^{k+0.125}$ needs to be adopted and $W_N^{k+0.125}$ is not symmetrical. Therefore, at least cosine values of N/4 points and sine values of N/4 points need to be stored during pre-rotation and post-rotation. The rotation factors adopted by the signal processing method provided in the embodiment of the present invention are products of a constant and $W_N^{k+0.125}$. Because $W_N^{k+0.125}$ is symmetrical, it is only necessary to store a data table of N/4 points to complete the pre-rotation and post-rotation. Compared with the prior art, the signal processing method in this embodiment significantly reduces the amount and complexity of storage, reduces the consumption of storage resources, and increases the transform efficiency.

Exemplary embodiments of the signal processing method of the present invention will be described.

Figure 4:
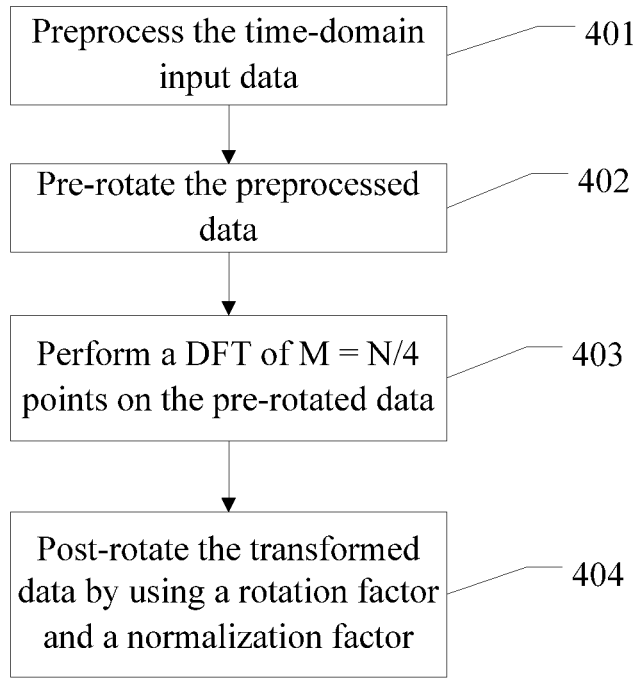
FIG. 4 is a flowchart of a time-domain to frequency-domain signal processing method in a third embodiment of the present invention.

Assume that the sampling frequency of a wideband audio codec is 16 kHz and that the processed frame size is 20 ms. One frame contains 320 sampling points. The time-domain to frequency-domain signal processing method provided in an embodiment of the present invention is used to perform forward transforms at the encoder. The input data of a forward transform is $X_n$; $X_{0\sim N/2-1}$ is the cached 320-point data of the previous frame and $X_{N/2\sim N-1}$ is the 320-point data of the current frame; the transform section length N is 640 points. FIG. 4 is a flowchart of the signal processing method provided in the third embodiment of the present invention. The method includes:

401. Pre-process the time-domain input data.

In this step, pre-processing includes windowing and twiddling.

If $x_n$ is 640-point time-domain input data and $h_n$ is a 640-point window function that satisfies the perfect reconstruction condition, the windowed data $y_n$ satisfies:

$$y_n = h_n x_n \, n=0, \Lambda, N-1,$$

where, $h_n$ is a window function that satisfies the perfect reconstruction condition, which may be described as an analysis window function.

The windowed data is twiddled and the obtained data $u_n$ satisfies:

$$u_n = \left(z_{2n} + jz_{\frac{N}{2}-1-2n}\right) \quad n = 0, \Lambda, \frac{N}{4}-1$$

where:

$$\begin{cases} z_{n+\frac{N}{4}} = y_n - y_{\frac{N}{2}-1-n} \\ z_{\frac{N}{4}-1-n} = -y_{N-1-n} - y_{\frac{N}{2}+n} \end{cases} \quad n = 0, \Lambda, \frac{N}{4}-1$$

or, $$\begin{cases} z_n = -y_{n+\frac{3N}{4}} - y_{\frac{3N}{4}-1-n} & n = 0, \Lambda, \frac{N}{4}-1 \\ z_n = -y_{n-\frac{N}{4}} - y_{\frac{3N}{4}-1-n} & n = \frac{N}{4}, \Lambda, \frac{N}{2}-1 \end{cases}$$

402. Pre-rotate the pre-processed data by using the rotation factor $a \cdot W_N^{n+0.5}$.

The twiddled data u, is pre-rotated by using the rotation factor $a \cdot W_N^{n+0.5}$, n=0, L, N/4−1, where, $$W_N = e^{-j\frac{2\pi}{N}} = \cos\left(\frac{2\pi}{N}\right) - j\sin\left(\frac{2\pi}{N}\right)$$

and a is a constant.

In this embodiment, a=1 and the rotation factor may be expressed by:

$$W_N^{n+0.5} = e^{-j\frac{2\pi}{N}(n+0.5)} = \cos\left(\frac{2\pi(n+0.5)}{N}\right) - j\sin\left(\frac{2\pi(n+0.5)}{N}\right)$$

The equation satisfies $$\cos\left(\frac{2\pi}{N}(n+0.5)\right) = \sin\left(\frac{2\pi}{N}\left(\frac{N}{4} - 1 - n + 0.5\right)\right) \text{ and}$$

$$\sin\left(\frac{2\pi}{N}(n+0.5)\right) = \cos\left(\frac{2\pi}{N}\left(\frac{N}{4} - 1 - n + 0.5\right)\right).$$

It is only necessary to store any N/4 points data table of $$\cos\left(\frac{2\pi}{N}(n+0.5)\right) \text{ or } \sin\left(\frac{2\pi}{N}(n+0.5)\right)$$

in the specific implementation. In this embodiment, a sine table of N/4 points is stored. Values in the sine table are expressed by $\sin(2\pi/N(n+0.5))$, $n=0, \Lambda, 159$.

403. Perform a DFT of N/4 inputs on the pre-rotated data.

In this step, a common DFT of M=N/4=160 points may be used or other FFTs of M=N/4=160 points may be used.

404. Post-rotate the data after the DFT by using the rotation factor $b \cdot W_N^{k+0.5}$ and the normalization factor A to obtain the frequency-domain output data.

The transformed data is post-rotated by using the rotation factor $b \cdot W_N^{k+0.5}$, $k=0, L, N/4-1$, where $$W_N = e^{-j\frac{2\pi}{N}} = \cos\left(\frac{2\pi}{N}\right) - j\sin\left(\frac{2\pi}{N}\right)$$

and b is a constant. In this embodiment, b=1 and the rotation factor may be expressed by:

$$W_N^{k+0.5} = e^{-j\frac{2\pi}{N}(k+0.5)} = \cos\left(\frac{2\pi(k+0.5)}{N}\right) - j\sin\left(\frac{2\pi(k+0.5)}{N}\right),$$

$$k = 0, \Lambda, \frac{N}{4} - 1$$

As b=a, the N/4-point data table used in step 402 may be used in the implementation of this step.

The final data $X_k$, $k=0, L, N/2-1$ is obtained.

$$X_{2k} = A \cdot \text{Re}\left\{b \cdot W_N^{k+0.5} \sum_{n=0}^{\frac{N}{4}-1} u_n \cdot a \cdot W_N^{n+0.5} W_{\frac{N}{4}}^{nk}\right\} \quad k = 0, \Lambda, \frac{N}{4} - 1$$

$$X_{\frac{N}{2}-1-2k} = A \cdot -\text{Im}\left\{b \cdot W_N^{k+0.5} \sum_{n=0}^{\frac{N}{4}-1} u_n \cdot a \cdot W_N^{n+0.5} W_{\frac{N}{4}}^{nk}\right\}$$

$$k = 0, \Lambda, \frac{N}{4} - 1$$

where, A is a normalization factor and a constant.

In this embodiment, the constant A may be $$\frac{2}{\sqrt[2]{N}}.$$

According to the time-domain to frequency-domain signal processing method provided in the third embodiment of the present invention, a frequency-domain to time-domain signal processing method is provided in the fourth embodiment of the present invention. When the time-domain to frequency-domain signal processing method provided in the third embodiment of the present invention is used to perform a transform, the frequency-domain to time-domain signal processing method provided in the fourth embodiment of the present invention may be used to perform a corresponding inverse transform.

Figure 5:
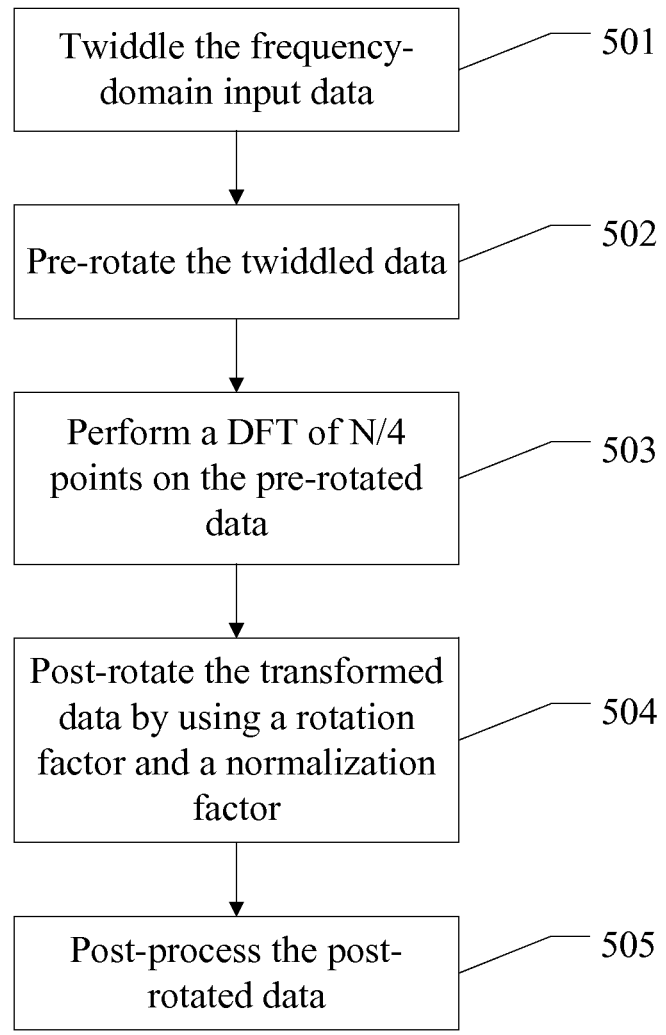
FIG. 5 is a flowchart of a frequency-domain to time-domain signal processing method in a fourth embodiment of the present invention.

FIG. 5 is a flowchart of the frequency-domain to time-domain signal processing method in the fourth embodiment of the present invention. The method includes:

501. Twiddle the frequency-domain input data.

In this embodiment, the data $X_k$, $k=0, \Lambda, N/2-1$ is twiddled to obtain the intermediate variable $(X_{2k}+jX_{N/2-1-2k})$, $k=0, \Lambda, N/4-1$, where N=640.

502. Pre-rotate the twiddled data by using the rotation factor $c \cdot W_N^{k+0.5}$.

The twiddled data is pre-rotated by using the rotation factor $c \cdot W_N^{k+0.5}$, $k=0, \Lambda, N/4-1$, where, $$W_N = e^{-j\frac{2\pi}{N}} = \cos\left(\frac{2\pi}{N}\right) - j\sin\left(\frac{2\pi}{N}\right)$$

and c is a constant. In this embodiment, c=1 and the N/4-point data table used in steps 402 and 404 in the time-domain to frequency-domain signal processing method provided in the third embodiment of the present invention may also be reused.

503. Perform a DFT of N/4 points on the pre-rotated data.

A DFT of M=N/4=160 points is performed on the rotated data. In this step, a common DFT of 160 points may be used or other 160-point FFTs may be used.

504. Post-rotate the data after the DFT by using the rotation factor $d \cdot W_N^{n+0.5}$ and the normalization factor B.

The transformed data is post-rotated by using the rotation factor $d \cdot W_N^{n+0.5}$, $n=0, L, N/4-1$, where, $$W_N = e^{-j\frac{2\pi}{N}} = \cos\left(\frac{2\pi}{N}\right) - j\sin\left(\frac{2\pi}{N}\right)$$

and d is a constant. The data obtained after the above processing is $y_n$:

$$y_n = \begin{cases} B \cdot (-j) \cdot d \cdot W_N^{n+0.5} \sum_{k=0}^{\frac{N}{4}-1}\left[\left(X_{2k} + jX_{\frac{N}{2}-1-2k}\right) \cdot & n = 0, L, \frac{N}{8} - 1 \\ c \cdot W_N^{k+0.5}\right]W_{\frac{N}{4}}^{nk} & \\ B \cdot d \cdot W_N^{n+0.5} \sum_{k=0}^{\frac{N}{4}-1}\left[\left(X_{2k} + jX_{\frac{N}{2}-1-2k}\right) \cdot & n = \frac{N}{8}, L, \frac{N}{4} - 1 \\ c \cdot W_N^{k+0.5}\right]W_{\frac{N}{4}}^{nk} & \end{cases}$$

B is a normalization factor and a constant. In this embodiment, the constant B may be $$\frac{2}{\sqrt[2]{N}}.$$

In this embodiment, d=1 and the N/4-point data table used in steps 402 and 404 in the time-domain to frequency-domain signal processing method provided in the third embodiment of the present invention may also be reused.

505. Post-process the post-rotated data to obtain the time-domain output data.

In this step, post-processing includes windowing and twiddling. In practice, other post-processing means may be adopted.

After the windowing and twiddling, the output data $\hat{x}_n$, n=0, Λ, N/2−1 is obtained, which satisfies:

$$\begin{cases} \hat{x}_{2n} = m_{2n}g_{\frac{N}{2}+2n} + \text{Re}\{u_n\}g_{2n} \\ \hat{x}_{\frac{N}{2}-1-2n} = m_{\frac{N}{2}-1-2n}g_{N-1-2n} - \text{Re}\{u_n\}g_{\frac{N}{2}-1-2n} \end{cases} \quad n = 0, \Lambda, \frac{N}{4}-1$$

where, $$\begin{cases} u_n = y_{n+\frac{N}{8}} \\ u_{n+\frac{N}{8}} = y_n \end{cases} \quad n = 0, L, \frac{N}{8}-1,$$

and $g_n$ is a synthesis window, which satisfies the perfect reconstruction condition together with the analysis window $h_n$, that is, $h_n g_n + h_{n+N/2} g_{n+N/2} = 1$, n=0, Λ, N−N/2−1. $m_n$ is the buffered data of the previous frame and the update of $m_n$ satisfies:

$$\begin{cases} m_{\frac{N}{4}-1-2n} = m_{\frac{N}{4}+2n} = \text{Im}\{u_n\} & n = 0, \Lambda, \frac{N}{8}-1 \\ m_{2n-\frac{N}{4}} = m_{\frac{3N}{4}-1-2n} = \text{Im}\{u_n\} & n = \frac{N}{8}, \Lambda, \frac{N}{4}-1 \end{cases}$$

To satisfy the perfect reconstruction condition, a forward, inverse, or forward-inverse transform may be multiplied by a specific normalization factor. In this embodiment, the forward and inverse transforms are multiplied by a same normalization factor. Optionally, only the forward transform or the inverse transform is multiplied by the specific normalization factor or the forward transform and the inverse transform are multiplied by different normalization factors. A perfect reconstruction can be completed so long as a×b×c×d×A×B=4/N.

Further, when the normalization factor is used, an address table may also be adopted to perform FFTs. Assume that in a super wideband audio codec, the sampling frequency of the super wideband audio encoder is 32 kHz and that the processed frame size is 20 ms. That is, one frame contains 640 sampling points. A forward transform is performed on the data. If $x_n$ is the input data of the forward transform, $X_{0 \sim N/2-1}$ is the cached 640-point data of the previous frame and $X_{N/2 \sim N-1}$ is the 640-point data of the current frame.

Figure 6:
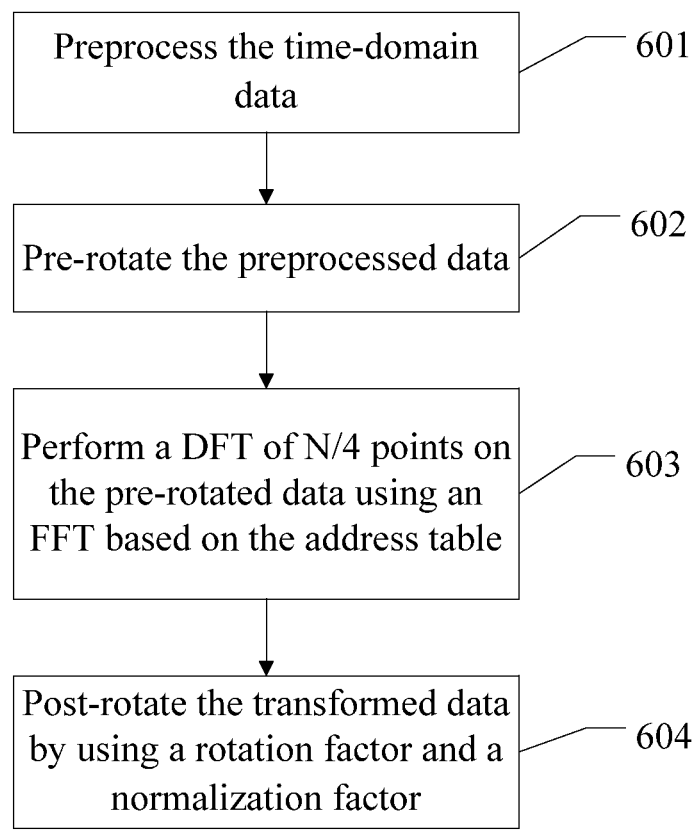
FIG. 6 is a flowchart of a time-domain to frequency-domain signal processing method in a fifth embodiment of the present invention.

FIG. 6 is a flowchart of a time-domain to frequency-domain signal processing method in the fifth embodiment of the present invention. The method includes the following steps:

601. Pre-process the time-domain data.

The pre-processing includes windowing and twiddling.

If $x_n$ is 1280-point time-domain input data and $h_n$ is a 1280-point window function that satisfies the perfect reconstruction condition, the windowed data $y_n$ satisfies:

$$y_n = h_n x_n, n=0, \Lambda, N-1$$

The windowed data is twiddled and the obtained data $u_n$ satisfies:

$$u_n = \left(z_{2n} + jz_{\frac{N}{2}-1-2n}\right) \quad n = 0, \Lambda, \frac{N}{4}-1$$

where:

$$\begin{cases} z_{n+\frac{N}{4}} = y_n - y_{\frac{N}{2}-1-n} \\ z_{\frac{N}{4}-1-n} = -y_{N-1-n} - y_{\frac{N}{2}+n} \end{cases} \quad n = 0, \Lambda, \frac{N}{4}-1$$

or, $$\begin{cases} z_n = -y_{n+\frac{3N}{4}} - y_{\frac{3N}{4}-1-n} & n = 0, \Lambda, \frac{N}{4}-1 \\ z_n = y_{n-\frac{N}{4}} - y_{\frac{3N}{4}-1-n} & n = \frac{N}{4}, \Lambda, \frac{N}{2}-1 \end{cases}$$

The window functions satisfy the perfect reconstruction condition when the analysis window function $h_n$ in this step and the synthesis window function $g_n$ used in the inverse transform satisfy the following equation:

$$h_n g_n + h_{n+N/2} g_{n+N/2} = 1, n=0, \Lambda, N/2-1$$

602. Pre-rotate the pre-processed data by using the rotation factor $a \cdot W_N^{n+0.5}$.

The twiddled data $u_n$ is pre-rotated by using the rotation factor $a \cdot W_N^{n+0.5}$. The data obtained after the rotation is $u_n \cdot a \cdot W_N^{n+0.5}$, n=0, L, N/4−1, where, $$W_N = e^{-j\frac{2\pi}{N}} = \cos\left(\frac{2\pi}{N}\right) - j\sin\left(\frac{2\pi}{N}\right)$$

and a is a constant. To further reduce the complexity of computation, the normalization factor may be directly combined with the rotation factor. In this embodiment, the constant a may be $$a = \frac{\sqrt{2}}{\sqrt[4]{N}} \cdot W_N^{n+0.5}$$

in the rotation factor may be expressed in the following form:

$$W_N^{n+0.5} = e^{-j\frac{2\pi}{N}(n+0.5)} = \cos\left(\frac{2\pi(n+0.5)}{N}\right) - j\sin\left(\frac{2\pi(n+0.5)}{N}\right)$$

and:

$$\cos\left(\frac{2\pi}{N}(n+0.5)\right) = \sin\left(\frac{2\pi}{N}\left(\frac{N}{4}-1-n+0.5\right)\right)$$

$$\sin\left(\frac{2\pi}{N}(n+0.5)\right) = \cos\left(\frac{2\pi}{N}\left(\frac{N}{4}-1-n+0.5\right)\right)$$

Therefore, it is only necessary to store a data table of N/4 points. In this embodiment, a data table of N/4 points is stored and the values in the table are expressed by $$\frac{1}{\sqrt[4]{320}}\cos\left(\frac{2\pi}{N}(n+0.5)\right), n=0, L, 319.$$

603. Perform a DFT of N/4 points on the pre-rotated data using an FFT based on the address table.

In this embodiment, an FFT of M=N/4=P×Q points is performed where P and Q are coprime positive integers. The FFT includes the following steps:

i. Let P=64, Q=5, and P and Q be coprime and satisfy M=N/4=P×Q=320; create an address table I, which satisfies:

$$I=<K_1 \times n_1 + K_2 \times n_2>_M, n_1=0, \Lambda, P-1$$

$$n_2=0, \Lambda, Q-1$$

$K_1$ and $K_2$ are coprime positive integers that satisfy $<K_1 K_2>_M=0$, where $K_1 K_2=Z$ and $<Z>_M$ means Z modulo M, which is the remainder of division of Z by M.

Addresses stored in address table I need to traverse 0, 1, . . . , M−1 to form a one-to-one mapping with the input data so as to determine the sequential relations of the data. When address table I satisfies the one-to-one mapping, the following three conditions need to be met:

(1) $K_1$ is a positive integral multiple of Q and/or $K_2$ is a positive integral multiple of P.

(2) $K_1$ and P are coprime.

(3) $K_2$ and Q are coprime.

In this embodiment, $K_1$=65, $K_2$=256 and the address table I may be expressed by:

$$I=<65n_1+256n_2>_{320}$$

where, n=0, L, 63 and $n_2$=0, L, 4.

The address table I may be calculated and stored in advance. This step has no sequential relation with steps 601 and 602. In practice, the address table I may be stored in a table. In this embodiment, the table is stored as one-dimensional arrays of $n_2 \times n_1$.

ii. Perform P-point DFT for Q times based on the address table I.

$$DFT\_P(z(I+iP))_x, i=0, \Lambda, Q-1$$

The input data of each P-point DFT is the data corresponding to the P continuous indexes starting from I+iP. Each P-point DFT is applied a circular shift with a step of x. Here, x is the inverse number of a cyclic modulus of $$<\frac{K_1^2}{Q}>_P$$

over P and satisfies $$<x \cdot <\frac{K_1^2}{Q}>_P>_P = 1.$$

In this embodiment, 64-point DFTs are performed for five times. The input data of the $i^{th}$ (i=0, L 4) 64-point DFT is that associated with the 64 continuous address indexes starting from the address table array I[64i](data after rotation). The $i^{th}$ 64-point DFT is applied a circular shift with a step of five. For example, the result of circular shift with a step of two on the vector $Z=[z_0\ z_1\ z_2\ z_3\ z_4]$ is $Z=[z_0\ z_2\ z_4\ z_1\ z_3]$. In addition, to further increase the efficiency of computation, the FFT may be used in stead of the DFT.

iii. Perform Q-point DFT for P times based on the address table I.

$$DFT\_Q(z(I+i))_y, i=0, \Lambda, P-1;$$

The input data of each Q-point DFT is that corresponding to the Q indexes starting from point I+i in table I each of which are separated by a step of P. The result of each Q-point DFT is applied a circular shift with a step of y. Here, y is the inverse of a cyclic modulus of $$<\frac{K_2^2}{P}>_Q$$

over Q and satisfies $$<y \cdot <\frac{K_2^2}{P}>_Q>_Q = 1.$$

In this embodiment, 5-point DFTs are performed for 64 times. The input data of the $i^{th}$ (i=0, L 63) 5-point DFT is that associated with the 5 address indexes at spacing of 64 points starting from the address table array I[i] (data after rotation). The $i^{th}$ 5-point DFT is applied a circular shift with a step of four.

604. Post-rotate the data after the DFT by using the rotation factor $b \cdot W_N^{k+0.5}$ and the normalization factor A to obtain the frequency-domain data.

The transformed data is post-rotated by using the rotation factor $b \cdot W_N^{k+0.5}$, k=0, L, N/4−1, where $$W_N = e^{-j\frac{2\pi}{N}} = \cos\left(\frac{2\pi}{N}\right) - j\sin\left(\frac{2\pi}{N}\right)$$

and b is a constant. In this embodiment, the constant b may be $$b = \frac{\sqrt{2}}{\sqrt[4]{N}}.$$

When $$b = \frac{\sqrt{2}}{\sqrt[4]{N}},$$

because $W_N^{k+0.5}$ in the rotation factor may be expressed in the following form:

$$W_N^{k+0.5} = e^{-j\frac{2\pi}{N}(k+0.5)} = \cos\left(\frac{2\pi(k+0.5)}{N}\right) - j\sin\left(\frac{2\pi(k+0.5)}{N}\right),$$

$$k = 0, \Lambda, \frac{N}{4} - 1$$

and the value of b equals a in step 602, the data table of N/4 points stored in step 602 may also be reused in this step.

The output data, also the final spectrum, is $X_k$, k=0, L, N/2−1 and may be expressed by:

$$X_{2k} = A \cdot \text{Re}\left\{b \cdot W_N^{k+0.5} \sum_{n=0}^{\frac{N}{4}-1} u_n \cdot a \cdot W_N^{n+0.5} W_{\frac{N}{4}}^{nk}\right\} k = 0, \Lambda, \frac{N}{4}-1$$

$$X_{\frac{N}{2}-1-2k} = A \cdot -\text{Im}\left\{b \cdot W_N^{k+0.5} \sum_{n=0}^{\frac{N}{4}-1} u_n \cdot a \cdot W_N^{n+0.5} W_{\frac{N}{4}}^{nk}\right\}$$

$$k = 0, \Lambda, \frac{N}{4}-1$$

where, A is a normalization factor and a constant.

According to the time-domain to frequency-domain signal processing method provided in the fifth embodiment of the present invention, a frequency-domain to time-domain signal processing method is provided in the sixth embodiment of the present invention. When the time-domain to frequency-domain signal processing method provided in the fifth embodiment of the present invention is used to perform a transform, the frequency-domain to time-domain signal processing method provided in the sixth embodiment of the present invention may be used to perform a corresponding inverse transform.

Figure 7:
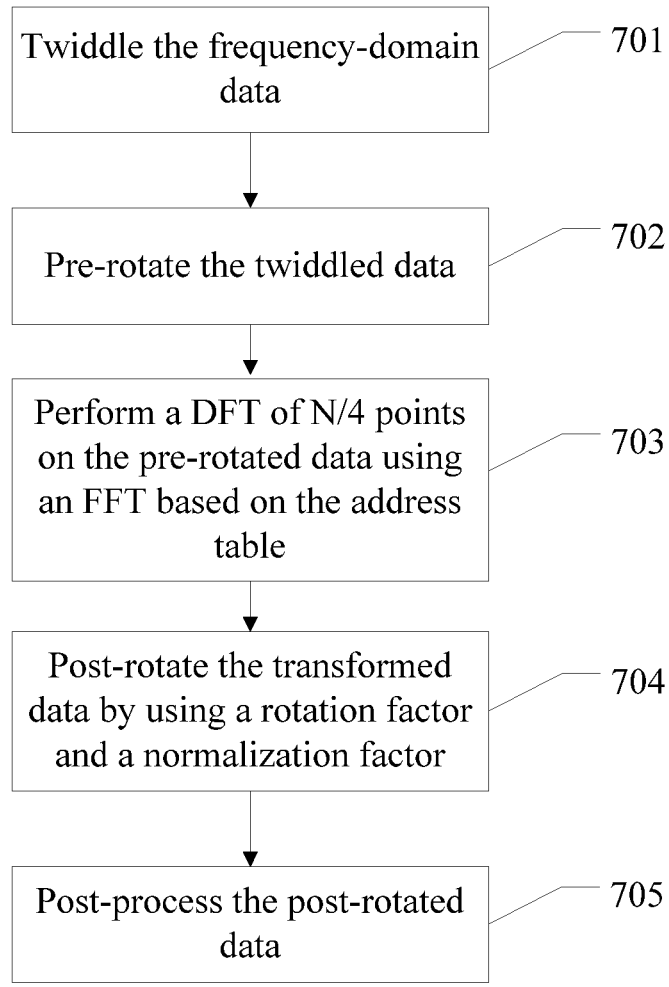
FIG. 7 is a flowchart of a frequency-domain to time-domain signal processing method in a sixth embodiment of the present invention.

FIG. 7 is a flowchart of the frequency-domain to time-domain signal processing method in the sixth embodiment of the present invention, and $X_k$, k=0, Λ, N/4−1 is the input data of the inverse transform. The method includes the following steps:

701. Twiddle the frequency-domain data.

Specifically, the input data $X_k$, k=0, L, N/2−1 is twiddled.

An intermediate variable obtained after the twiddling is $(X_{2k}+jX_{N/2-1-2k})$, k=0, Λ, N/4−1.

702. Pre-rotate the twiddled data by using the rotation factor $c \cdot W_N^{k+0.5}$, k=0, Λ, N/4−1.

$$W_N = e^{-j\frac{2\pi}{N}} = \cos\left(\frac{2\pi}{N}\right) - j\sin\left(\frac{2\pi}{N}\right)$$

and c is a constant.

In this embodiment, $$c = \frac{\sqrt{2}}{\sqrt[4]{N}}$$

and c equals a or b. Therefore, the N/4-point data table used in steps 602 and 604 in the time-domain to frequency-domain signal processing method provided in the fifth embodiment of the present invention may also be reused in this step.

703. Perform a DFT of N/4 points on the pre-rotated data using an FFT based on the address table.

When M=N/4=P×Q and P and Q are coprime, the data processing method in step 603 of the time-domain to frequency-domain signal processing method provided in the fifth embodiment of the present invention may be used to perform this step.

704. Post-rotate the data after the transform by using the rotation factor $d \cdot W_N^{n+0.5}$ and the normalization factor B.

The transformed data is post-rotated by using the rotation factor $d \cdot W_N^{n+0.5}$, n=0, L, N/4−1, where, $$W_N = e^{-j\frac{2\pi}{N}} = \cos\left(\frac{2\pi}{N}\right) - j\sin\left(\frac{2\pi}{N}\right)$$

and d is a constant. The data obtained after the above processing is $y_n$:

$$y_n = \begin{cases} B \cdot (-j) \cdot d \cdot W_N^{n+0.5} \sum_{k=0}^{\frac{N}{4}-1} \left[(X_{2k} + \quad n = 0, \Lambda, \frac{N}{8}-1 \\ jX_{\frac{N}{2}-1-2k}) \cdot c \cdot W_N^{k+0.5}\right] W_{\frac{N}{4}}^{nk} \\ B \cdot d \cdot W_N^{n+0.5} \sum_{k=0}^{\frac{N}{4}-1} \left[(X_{2k} + \quad n = \frac{N}{8}, \Lambda, \frac{N}{4}-1 \\ jX_{\frac{N}{2}-1-2k}) \cdot c \cdot W_N^{k+0.5}\right] W_{\frac{N}{4}}^{nk} \end{cases}$$

B is a normalization factor and a constant.

In this embodiment, $$d = \frac{\sqrt{2}}{\sqrt[4]{N}}$$

and d equals a, b, or c. Therefore, the N/4-point data table used in steps 602 and 604 in the time-domain to frequency-domain signal processing method provided in the fifth embodiment of the present invention may also be reused in this step.

705. Windowing and twiddling the post-rotated data to obtain the time-domain data.

After the windowing and twiddling, the output data $\hat{x}_n$, n=0, Λ, N/2−1 is obtained.

$$\begin{cases} \hat{x}_{2n} = m_{2n}g_{\frac{N}{2}+2n} + \text{Re}\{u_n\}g_{2n} \\ \hat{x}_{\frac{N}{2}-1-2n} = m_{\frac{N}{2}-1-2n}g_{N-1-2n} - \text{Re}\{u_n\}g_{\frac{N}{2}-1-2n} \end{cases} n = 0, \Lambda, \frac{N}{4}-1$$

where, $$\begin{cases} u_n = y_{n+\frac{N}{8}} \\ u_{n+\frac{N}{8}} = y_n \end{cases} n = 0, L, \frac{N}{8}-1,$$

and $g_n$ is a synthesis window, which satisfies the perfect reconstruction condition together with the analysis window h, that is, $h_n g_n + h_{n+N/2} g_{n+N/2} = 1$, n=0, Λ, N−N/2−1. $m_n$ is the buffered data of the previous frame and the update of $m_n$ satisfies:

$$\begin{cases} m_{\frac{N}{4}-1-2n} = m_{\frac{N}{4}+2n} = \text{Im}\{u_n\} & n = 0, \Lambda, \frac{N}{8}-1 \\ m_{2n-\frac{N}{4}} = m_{\frac{3N}{4}-1-2n} = \text{Im}\{u_n\} & n = \frac{N}{8}, \Lambda, \frac{N}{4}-1 \end{cases}$$

In the prior art, most DFTs based on coprime factor do not take into account the sequential access of the data sequence.

The data obtained through a transform needs to be rearranged to obtain the final output data. Thus, the amount of computation is increased. In the embodiment of the present invention, an address table is adopted in an FFT, where addressing is based on the address table, the input data is read according to the associated addresses in the address table and the output data is stored according to the associated addresses in the address table. Thus, the sequence of the data obtained after a transform is ready without any special rearrangement.

A data processing method provided in an embodiment of the present invention includes:

1. Create an address table.
2. Perform P-point DFT for Q times on the input data based on the address table.
3. Perform Q-point DFT for P times on the data obtained after the P-point DFT for Q times based on the address table.

P and Q are coprime positive integers; M is the length of the address table and M=P×Q; the addresses stored in the address table can traverse 0, 1, . . . , M−1 and form a one-to-one mapping with the input data.

In practice, the address table may be obtained in multiple approaches. In this embodiment, the address table is obtained by using the formula $<K_1 \times n_1 + K_2 \times n_2>_M$.

The address table $I=<K_1 \times n_1 + K_2 \times n_2>_M$, $n_1=0, \Lambda, P-1$, $n_2=0, \Lambda, Q-1$, $K_1$ and $K_2$ are coprime positive integers satisfying $<K_1 K_2>_M=0$. $<Z>_M$ means Z modulo M.

When the address table I satisfies the one-to-one mapping, the following three conditions need to be met:

(1) $K_1$ is a positive integral multiple of Q and/or $K_2$ is a positive integral multiple of P.

(2) $K_1$ and P are coprime.

(3) $K_2$ and Q are coprime.

The data processing method in this embodiment is applicable to FFTs where M=P×Q and P and Q are coprime positive integers. Taking a 320-point FFT where P=64, Q=5, and P and Q are coprime as an example, a flowchart of the data processing method provided in this embodiment is shown in FIG. 2. The method includes the following steps:

1031. Create an address table I.

The address table I satisfies:

$$I=<K_1 \times n_1 + K_2 \times n_2>_M\, n_1=0,\Lambda,P-1$$

$$n_2=0,\Lambda,Q-1$$

$K_1$ and $K_2$ are coprime positive integers that satisfy $<K_1 K_2>_M=0$. $<Z>_M$ means Z modulo M.

In this embodiment, $K_1=5$, $K_1=64$, and the address table I may be expressed by:

$$I=<5n_1+64n_2>_{320}$$

where, $n_1=0, \Lambda, 63$ and $n_2=0, \Lambda, 4$.

The address table I may be calculated and stored in advance. In practice, the address table I may be stored in a table. In this embodiment, the table is stored as two-dimensional arrays of $I[n_1][n_2]$.

1032. Perform P-point DFT for Q times on the input data according to the address table I.

The input data of the $i^{th}$ ($i=0, \Lambda, Q-1$) P-point DFT is the data associated with the P address indexes corresponding to $n_2=i$, $n_1=0, \Lambda, P-1$ in the address table I. The result of the $i^{th}$ P-point DFT is applied a circular shift with a step of x to obtain the final output.

Here, x is the inverse of a cyclic modulus of $$<\frac{K_1^2}{Q}>_P$$

over P and satisfies $$<x \cdot <\frac{K_1^2}{Q}>_P>_P = 1.$$

For example, if the address table I is stored in the form of two-dimensional arrays of $I[n_1][n_2]$, the input data of the $i^{th}$ P-point DFT is that associated with the P address indexes stored in the address table $I[n_1][i]$, $n_1=0, \Lambda, P-1$. The result of each P-point DFT is applied a circular shift with a step of x. In this embodiment, because $K_1=5$, P=64, and Q=5, x=13.

1033. Perform Q-point DFT for P times on the transformed data according to the address table I.

The input data of the $i^{th}$ ($i=0, \Lambda, P-1$) Q-point DFT is the data associated with the Q address indexes corresponding to $n_1=i$, $n_2=0, \Lambda, Q-1$ in the address table I. The result of the $i^{th}$ Q-point DFT is applied a circular shift with a step of y to obtain the final output.

Here, y is the inverse of a cyclic modulus of $$<\frac{K_2^2}{P}>_Q$$

over Q and satisfies $$<y \cdot <\frac{K_2^2}{P}>_Q>_Q = 1.$$

For example, if the address table I is stored in the form of two-dimensional arrays of $I[n_1][n_2]$, the input data of the $i^{th}$ Q-point DFT is that associated with the Q address indexes stored in the address table $I[n_1][n_2]$, $n_2=0, L, Q-1$. The result of each Q-point DFT is applied a circular shift with a step of y. In this embodiment, because $K_2=64$, P=64, and Q=5, y=4.

In the data processing method provided in the embodiment of the present invention, because the address table is adopted for addressing, when a DFT is performed, the input data is read according to the associated addresses in the address table and the output data is stored according to the associated addresses in the address table. The transformed data is in a ready sequence and no special rearrangement is required by an inverse transform. Thus, the addressing cost in the computation is reduced and the efficiency of computation is increased.

Those skilled in the art understand that part or all steps in the method in the preceding embodiments may be implemented by related hardware instructed by a program. The program may be stored in a computer readable storage medium. The execution of the program includes the following steps:

A time-domain to frequency-domain signal processing method includes:
pre-processing the time-domain data;
pre-rotating the pre-processed data by using the rotation factor $a \cdot W_N^{n+0.5}$;
performing a DFT of N/4 points on the pre-rotated data; and
post-rotating the data after the DFT by using the rotation factor $b \cdot W_N^{k+0.5}$ to obtain the frequency-domain data;
where, a and b are constants, N is twice the length of the frequency-domain data, and $$W_N = e^{-j\frac{2\pi}{N}}.$$

A frequency-domain to time-domain signal processing method includes:
twiddling the frequency-domain data;
pre-rotating the twiddled data by using the rotation factor $c \cdot W_N^{k+0.5}$;
performing a DFT of N/4 points on the pre-rotated data;
post-rotating the data after the DFT by using the rotation factor $d \cdot W_N^{n+0.5}$; and
post-processing the post-rotated data to obtain the time-domain data;
where, c and d are constants, N is twice the length of the frequency-domain data, and $$W_N = e^{-j\frac{2\pi}{N}}.$$

A data processing method includes:
performing P-point DFT for Q times on the input data according to an address table; and
performing Q-point DFT for P times on the data obtained after the P-point DFT for Q times according to the address table.

The storage medium mentioned above may be a read-only memory (ROM), a magnetic disk or a compact disk.

Figure 8:
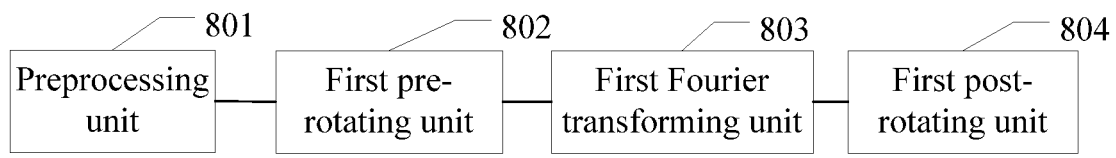
FIG. 8 shows a structure of a time-domain to frequency-domain signal processing apparatus in an embodiment of the present invention.

FIG. 8 shows a structure of a time-domain to frequency-domain signal processing apparatus in an embodiment of the present invention. The apparatus includes:
a pre-processing unit 801, configured to pre-process the time-domain data;
a first pre-rotating unit 802, configured to pre-rotate the data obtained by the pre-processing unit 801 by using the rotation factor $a \cdot W_N^{n+0.5}$
a first Fourier transforming unit 803, configured to perform a DFT of N/4 points on the data processed by the first pre-rotating unit 802; and
a first post-rotating unit 804, configured to post-rotate the data after the DFT performed by the first Fourier transforming unit 803 to obtain the frequency-domain data.
a and b are constants, N is the length of the time-domain data, n=0, L, N/4−1, k=0, L, N/4−1, and $$W_N = e^{-j\frac{2\pi}{N}}.$$

The first post-rotating unit 804 includes:
a second post-rotating unit, configured to post-rotate the data after the DFT is performed by using the rotation factor $b \cdot W_N^{k+0.5}$ and the normalization factor A to obtain the frequency-domain data.

The first Fourier transforming unit 803 includes:
a first transforming unit, configured to perform P-point DFT for Q times on the data processed by the first pre-rotating unit according to an address table; and
a second transforming unit, configured to perform Q-point DFT for P times on the data transformed by the first transforming unit according to the address table.
P and Q are coprime positive integers and M=N/4=P×Q. M is the length of the address table. The address table is $<K_1 \times n_1+K_2 \times n_2>_M$, where $n_1=0, \Lambda, P-1$ and $n_2=0, \Lambda, Q-1$. $K_1$ and $K_2$ are coprime positive integers and satisfy $<K_1K_2>_M=0$. $<Z>_M$ means Z modulo M.

Figure 9:
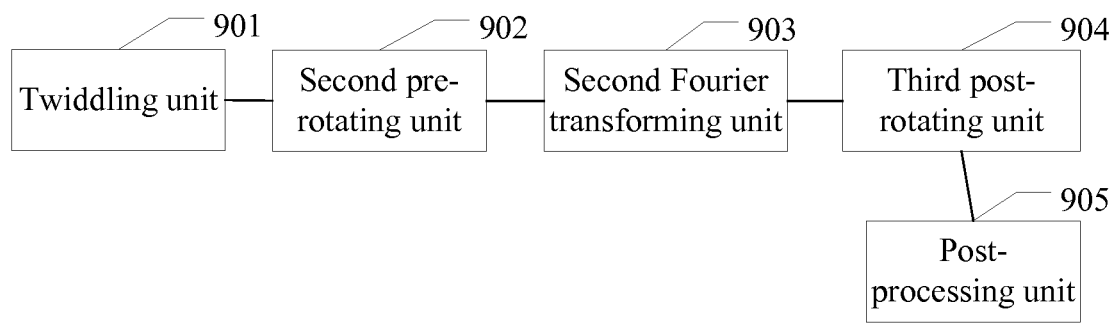
FIG. 9 shows a structure of a frequency-domain to time-domain signal processing apparatus in an embodiment of the present invention.

According to the time-domain to frequency-domain signal processing apparatus provided in the embodiment of the present invention, a frequency-domain to time-domain signal processing apparatus is provided in an embodiment of the present invention. FIG. 9 shows a structure of the frequency-domain to time-domain signal processing apparatus. The apparatus includes:
a twiddling unit 901, configured to twiddle the frequency-domain data;
a second pre-rotating unit 902, configured to pre-rotate the data obtained by the twiddling unit 901 by using the rotation factor $c \cdot W_N^{k+0.5}$;
a second Fourier transforming unit 903, configured to perform a DFT of N/4 points on the data processed by the second pre-rotating unit 902;
a third post-rotating unit 904, configured to post-rotate the data after the DFT performed by the second Fourier transforming unit 903; and
a post-processing unit 905, configured to post-process the data processed by the third post-rotating unit 904 to obtain the time-domain data.
c and d are constants, N is twice the length of the frequency-domain data, n=0, L, N/4−1, k=0, L, N/4−1, and $$W_N = e^{-j\frac{2\pi}{N}}.$$

The third post-rotating unit 904 includes:
a fourth post-rotating unit, configured to post-rotate the data after the DFT is performed by using the rotation factor $d \cdot W_N^{n+0.5}$ and the normalization factor B.
The second Fourier transforming unit 903 includes:
a third transforming unit, configured to perform P-point DFT for Q times on the data processed by the second pre-rotating unit according to an address table; and
a fourth transforming unit, configured to perform Q-point DFT for P times on the data transformed by the third transforming unit according to the address table.
P and Q are coprime positive integers and M=N/4=P×Q. M is the length of the address table. The address table is $<K_1 \times n_1+K_2 \times n_2>_M$, where $n=0, \Lambda, P-1$ and $n_2=0, \Lambda, Q-1$. $K_1$ and $K_2$ are coprime positive integers and satisfy $<K_1K_2>_M=0$. $<Z>_M$ means Z modulo M.

For specific applications of the time-domain to frequency-domain signal processing apparatus and the frequency-domain to time-domain signal processing apparatus provided in the embodiments of the present invention, refer to descriptions of the signal processing methods provided in the embodiments of the present invention.

In the time-domain to frequency-domain signal processing apparatus and the frequency-domain to time-domain signal processing method provided in the embodiments of the present invention, because $W_N^{n+0.5}$ in the rotation factor may be expanded to $$W_N^{n+0.5} = e^{-j\frac{2\pi}{N}(n+0.5)} = \cos\left(\frac{2\pi(n+0.5)}{N}\right) - j\sin\left(\frac{2\pi(n+0.5)}{N}\right)$$

and satisfies the $$\cos\left(\frac{2\pi}{N}(n+0.5)\right) = \sin\left(\frac{2\pi}{N}\left(\frac{N}{4} - 1 - n + 0.5\right)\right)$$
and
$$\sin\left(\frac{2\pi}{N}(n+0.5)\right) = \cos\left(\frac{2\pi}{N}\left(\frac{N}{4} - 1 - n + 0.5\right)\right)$$

condition, and $W_N^{k+0.5}$ in the rotation factor satisfies the same symmetrical condition, the time-domain to frequency-domain signal processing apparatus and the frequency-domain to time-domain signal processing apparatus provided in the embodiments of the present invention only need to store a data table of N/4 points. Compared with the prior art, where at least a sine table of N/4 points and a cosine table of N/4 points, altogether N/2 points, need to be stored, the embodiments of the present invention significantly reduce the complexity and amount of storage, reduce the consumption of storage resources, and increase the efficiency of signal processing.

Figure 10:
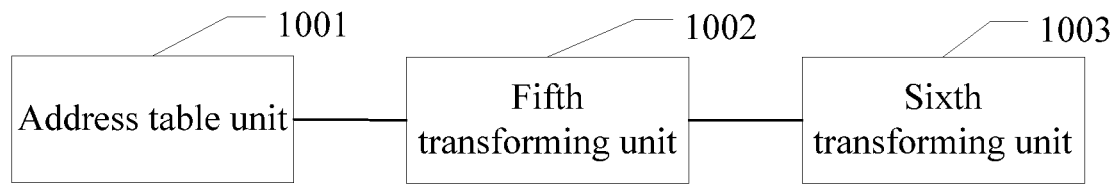
FIG. 10 shows a structure of a data processing apparatus in an embodiment of the present invention.

In the data processing apparatus provided in an embodiment of the present invention, an address table is adopted for addressing so as to guarantee a ready sequence of the output data and reduce the addressing cost. FIG. 10 shows a structure of the data processing apparatus provided in this embodiment. The apparatus includes an address table unit 1001, a fifth transforming unit 1002, and a sixth transforming unit 1003.

The address table unit 1001 is configured to create or store an address table.

The addresses stored in the address table can traverse 0, 1, ..., M−1 to form a one-to-one mapping with the input data.

In practice, the address table may be obtained in multiple approaches. In this embodiment, the address table is obtained by using the formula $<K_1 \times n_1 + K_2 \times n_2>_M$.

The address table $I = <K_1 \times n_1 + K_2 \times n_2>_M$, where $n_1 = 0, \Lambda, P-1$, $n_2 = 0, \Lambda, Q-1$, P and Q are coprime positive integers, $M = P \times Q$, $K_1$ and $K_2$ are coprime positive integers and satisfy $<K_1 K_2>_M = 0$. $<Z>_M$ means Z modulo M.

When the address table I satisfies the one-to-one mapping, the following three conditions need to be met:

(1) $K_1$ is a positive integral multiple of Q and/or $K_2$ is a positive integral multiple of P.

(2) $K_1$ and P are coprime.

(3) $K_2$ and Q are coprime.

The fifth transforming unit 1002 is configured to perform P-point DFT for Q times on the input data according to the address table created or stored by the address table unit 1001.

The input data of the $i^{th}$ (i=0, L, Q−1) P-point DFT is the data associated with the P address indexes corresponding to $n_2 = i$, $n_1 = 0, L, P-1$ in the address table I. The result of the $i^{th}$ P-point DFT is applied a circular shift with a step of x to obtain the final output.

Here, x is the inverse of a cyclic modulus of $$\left\langle\frac{K_1^2}{Q}\right\rangle_P$$

over P and satisfies $$\left\langle x \cdot \left(\frac{K_1^2}{P}\right)_P\right\rangle_P = 1.$$

For example, if the address table I is stored in the form of two-dimensional arrays of $I[n_1][n_2]$, the input data of the $i^{th}$ P-point DFT is that associated with the P address indexes stored in the address table $I[n_1][n_2]$, $n_1 = 0, \Lambda, P-1$. The result of each P-point DFT is applied a circular shift with a step of x.

The sixth transforming unit 1003 is configured to perform Q-point DFT for P times on the data transformed by the fifth transforming unit 1002 according to the address table created or stored by the address table unit 1001.

The input data of the $i^{th}$ (i=0, L, P−1) Q-point DFT is the data associated with the Q address indexes corresponding to $n_1 = i$, $n_2 = 0, L, Q-1$ in the address table I. The result of the $i^{th}$ Q-point DFT is applied a circular shift with a step of y to obtain the final output.

Here, y is the inverse of a cyclic modulus of $$\left\langle\frac{K_2^2}{P}\right\rangle_Q$$

over Q and satisfies $$\left\langle y \cdot \left(\frac{K_2^2}{P}\right)_Q\right\rangle_Q = 1.$$

For example, if the address table I is stored in the form of two-dimensional arrays of $I[n_1][n_2]$, the input data of the $i^{th}$ Q-point DFT is that associated with the Q address indexes stored in the address table $I[n_1][n_2]$, $n_2 = 0, L, Q-1$. The result of each Q-point DFT is applied a circular shift with a step of y.

In the data processing apparatus provided in the embodiment of the present invention, because the address table is adopted for addressing, when an FFT is performed, the input data is read according to the associated addresses in the address table and the output data is stored according to the associated addresses in the address table. The transformed data is in a ready sequence and no special rearrangement is required by an inverse transform. Thus, the addressing cost in the computation is reduced and the efficiency of computation is increased.

The following will prove that the transform based on the address table I ensures a ready sequence of the output data.

The definition of an FFT is:

$$X(k) = \sum_{n=0}^{M-1} x(n) \cdot W_M^{nk}.$$

$M = P \times Q$ and P and Q are coprime positive integers; if:

$n = <K_1 \times n_1 + K_2 \times n_2>_M$, $n_1 = 0, \Lambda, P-1$, $n_2 = 0, \Lambda, Q-1$ $k = <K_1 \times k_1 + K_2 \times k_2>_M\, k_1 = 0, \Lambda, P-1,$ $k_2 = 0, \Lambda, Q-1$ X(k) may be written as X'($k_1,k_2$) and X'($k_1,k_2$)=X($<K_1 \times k_1 + K_2 \times k_2>_M$); x(n) may be written as x'($n_1,n_2$) and x'($n_1,n_2$)=X($<K_1 \times n_1 + K_2 \times n_2>_M$)

Therefore the FFT formula may be expanded to:

$$X'(k_1, k_2) = \sum_{n_2=0}^{Q-1}\sum_{n_1=0}^{P-1} x'(n_1, n_2) \cdot W_M^{K_1 \cdot K_1 \cdot n_1 \cdot k_1} \cdot W_M^{K_2 \cdot K_2 \cdot n_2 \cdot k_2} \cdot W_M^{K_1 \cdot K_2 \cdot n_1 \cdot k_2} \cdot W_M^{K_2 \cdot K_1 \cdot n_2 \cdot k_1}$$

When $<K_1 K_2>_M = 0$, $W_M^{K_1 \cdot K_2 \cdot n_1 \cdot k_2} = W_M^{K_2 \cdot K_1 \cdot n_2 \cdot k_1} = 1$; therefore:

$$X'(k_1, k_2) = \sum_{n_2=0}^{Q-1}\left[\sum_{n_1=0}^{P-1} x'(n_1, n_2) \cdot W_M^{K_1^2 \cdot n_1 \cdot k_1}\right] W_M^{K_2^2 \cdot n_2 \cdot k_2}$$

$$= \sum_{n_2=0}^{Q-1}\left[\sum_{n_1=0}^{P-1} x'(n_1, n_2) \cdot W_P^{\frac{K_1^2}{Q} \cdot n_1 \cdot k_1}\right] W_Q^{\frac{K_2^2}{P} \cdot n_2 \cdot k_2}$$

Because $$W_P^{\frac{K_1^2}{Q} \cdot n_1 \cdot k_1} = W_P^{\left(\frac{K_1^2}{Q}\right)_P \cdot n_1 \cdot k_1}, \quad W_Q^{\frac{K_2^2}{P} \cdot n_2 \cdot k_2} = W_Q^{\left(\frac{K_2^2}{P}\right)_Q \cdot n_2 \cdot k_2}.$$

The input data of the $i^{th}$ (i=0, L, Q−1) P-point DFT is the data associated with the P address indexes corresponding to $n_2=i$, $n_1=0$, L, P−1 in the address table I. The result of the $i^{th}$ P-point DFT is applied a circular shift with a step of x to obtain the final output.

Here, x is the inverse of a cyclic modulus of $$\left(\frac{K_1^2}{Q}\right)_P$$

over P and satisfies $$\left\{x \cdot \left(\frac{K_1^2}{Q}\right)_P\right\}_P = 1.$$

$$\sum_{n_1=0}^{P-1} x'(n_1, n_2) \cdot W_P^{\frac{K_1^2}{Q} \cdot n_1 \cdot k_1} = \sum_{n_1=0}^{P-1} x'(n_1, n_2) \cdot W_P^{<\frac{K_1^2}{Q}> \cdot p \cdot n_1 \cdot k_1}.$$

When $n_1=0$, $$W_P^{<\frac{K_1^2}{Q}>_P \cdot p \cdot n_1 \cdot k_1} = 1;$$

when $n_1=1$, $$W_P^{<\frac{K_1^2}{Q}>_P \cdot p \cdot n_1 \cdot k_1} = W_P^{<\frac{K_1^2}{Q}>_P \cdot p \cdot k_1}.$$

by analogy, when $n_1=x$, $$W_P^{<\frac{K_1^2}{Q}>_P \cdot p \cdot n_1 \cdot k_1} = W_P^{<\frac{K_1^2}{Q}>_P \cdot p \cdot x \cdot k_1}.$$

In the FFT formula $$\sum_{n_1=0}^{P-1} x'(n_1) \cdot W_P^{n_1 \cdot k_1}$$

of sequential outputs, the rotation factor when $n_1=1$ is $W_P^{n_1 \cdot k_1} = W_P^{k_1}$. In the $i^{th}$ P-point DFT, $$W_P^{\left(\frac{K_1^2}{Q}\right)_P \cdot n_1 \cdot k_1} = W_P^{\left(\frac{K_1^2}{Q}\right)_P \cdot x \cdot k_1} = W_P^{k_1}$$

when $n_1=x$ only when x satisfies $$\left\{x \cdot \left(\frac{K_1^2}{Q}\right)_P\right\}_P = 1.$$

To enable sequential outputs of the $i^{th}$ P-point DFT, circular shift with a step of x need to be performed on the output corresponding to $n_1=0$, L, P−1.

Likewise, the input data of the $i^{th}$ (i=0, L, P−1) Q-point DFT is the data associated with the Q address indexes corresponding to $n_1=i$, $n_2=0$, L, Q−1 in the address table I. The result of the $i^{th}$ Q-point DFT is applied a circular shift with a step of y to obtain the final output.

Here, y is the inverse of a cyclic modulus of $$\left(\frac{K_2^2}{P}\right)_Q$$

over Q and satisfies $$\left\{y \cdot \left(\frac{K_2^2}{P}\right)_Q\right\}_Q = 1.$$

Although the present invention has been described through exemplary embodiments, the invention is not limited to such embodiments. It is apparent that those skilled in the art can make various modifications and variations to the invention without departing from the spirit and scope of the present invention. The invention is intended to cover the modifications and variations provided that they fall within the scope of protection defined by the claims or their equivalents.

What is claimed is:

1. A time-domain to frequency-domain signal processing method, comprising:
pre-processing, by a digital signal processor, time-domain data;
pre-rotating, by a digital signal processor, the pre-processed data by using a rotation factor $a \cdot W_N^{n+0.5}$;
performing, by a digital signal processor, a discrete Fourier transform (DFT) of N/4 points on the pre-rotated data; and
post-rotating, by a digital signal processor, the data transformed by the DFT by using a rotation factor $b \cdot W_N^{k+0.5}$ to obtain frequency-domain data; where:
a and b are constants, N is the length of the time-domain data, $$W_N = e^{-j\frac{2\pi}{N}},$$
$$W_N^{n+0.5} = e^{-j\frac{2\pi}{N}(n+0.5)},$$
$$W_N^{k+0.5} = e^{-j\frac{2\pi}{N}(k+0.5)},$$

n=0, . . . , N/4−1 and k=0, . . . , N/4−1.

2. The method of claim 1, wherein the step of performing, by a digital signal processor, the DFT of N/4 points on the pre-rotated data comprises:
performing, by the digital signal processor, P-point DFT for Q times on the pre-rotated data based on an address table; and
performing, by the digital signal processor, Q-point DFT for P times on the data obtained after the P-point DFT for Q times based on the address table; where:
P and Q are coprime positive integers and M=N/4=P×Q; M is the length of the address table; the address table is $<K_1 \times n_1 + K_2 \times n_2>_M$, where $n_1=0, \ldots, P-1$ and $n_2=0, \ldots, Q-1$, and $K_1$ and $K_2$ are coprime positive integers and satisfy $<K_1K_2>_M=0$.

3. The method of claim 2, wherein the address table is stored in a table in the form of arrays.

4. The method of claim 1, wherein the pre-processing comprises windowing and twiddling, or twiddling.

5. A frequency-domain to time-domain signal processing method, comprising:
twiddling, by a digital signal processor, frequency-domain data;
pre-rotating, by a digital signal processor, the twiddled data by using a rotation factor $c \cdot W_N^{k+0.5}$;
performing, by a digital signal processor, a discrete Fourier transform (DFT) of N/4 points on the pre-rotated data;
post-rotating, by a digital signal processor, the data transformed by the DFT by using a rotation factor $d \cdot W_N^{n+0.5}$; and
post-processing, by a digital signal processor, the post-rotated data to obtain time-domain data; where:
c and d are constants, N is twice the length of the frequency-domain data, $$W_N = e^{-j\frac{2\pi}{N}},$$
$$W_N^{n+0.5} = e^{-j\frac{2\pi}{N}(n+0.5)},$$
$$W_N^{k+0.5} = e^{-j\frac{2\pi}{N}(k+0.5)},$$

n=0, . . . , N/4−1, and k=0, . . . , N/4−1.

6. The method of claim 5, wherein the step of performing, by a digital signal processor, the DFT of N/4 points on the pre-rotated data comprises:
performing, by the digital signal processor, P-point DFT for Q times on the pre-rotated data according to an address table; and
performing, by the digital signal processor, Q-point DFT for P times on the data obtained after the P-point DFT for Q times according to the address table; where:
P and Q are coprime positive integers and M=N/4=P×Q; M is the length of the address table; the address table is $<K_1 \times n_1 + K_2 \times n_2>_M$, where $n_1=0, \ldots, P-1$ and $n_2=0, \ldots, Q-1$, and $K_1$ and $K_2$ are coprime positive integers and satisfy $<K_1K_2>_M=0$.

7. The method of claim 6, wherein the address table is stored in a table in the form of arrays.

8. The method of claim 6, wherein the post-processing comprises windowing and twiddling, or twiddling.

9. A data processing method, comprising:
performing, by a digital signal processor, P-point discrete Fourier transform (DFT) for Q times on data based on an address table; and
performing, by a digital signal processor, Q-point DFT for P times on the data obtained after the P-point DFT for Q times based on the address table;
wherein: P and Q are coprime positive integers; the address table is $<K_1 \times n_1 + K_2 \times n_2>_M$, where M is the length of the address table and M=P×Q, $n_1=0, \ldots, P-1, n_2=0, \ldots, Q-1$, and $K_1$ and $K_2$ are coprime positive integers that satisfy $<K_1K_2>_M=0$.

10. The method of claim 9, wherein the address table is stored in a table in the form of arrays.

11. A frequency-domain to time-domain signal processing apparatus in super wideband digital audio encoding, comprising:
a twiddling unit, configured on a digital signal processor to Twiddle frequency-domain data;
a second pre-rotating unit, configured on a digital signal processor to pre-rotate the data obtained by the twiddling unit by using a rotation factor $c \cdot W_N^{k+0.5}$;
a second Fourier transforming unit, configured on a digital signal processor to perform a discrete Fourier transform (DFT) of N/4 points on the data processed by the second pre-rotating unit;
a third post-rotating unit, configured on a digital signal processor to post-rotate the data transformed by the second Fourier transforming unit by using a rotation factor $d \cdot W_N^{n+0.5}$; and
a post-processing unit, configured on a digital signal processor to post-process the data processed by the third post-rotating unit to obtain time-domain data; where:
c and d are constants, N is twice the length of the frequency-domain data, $$W_N^{n+0.5} = e^{-j\frac{2\pi}{N}(n+0.5)},$$
$$W_N^{k+0.5} = e^{-j\frac{2\pi}{N}(k+0.5)},$$

n=0, . . . , N/4−1 and k=0, . . . , N/4−1.

12. The apparatus of claim 11, wherein the second Fourier transforming unit comprises:
a third transforming unit, configured to perform P-point DFT for Q times on the data processed by the second pre-rotating unit based on an address table; and a fourth transforming unit, configured to perform Q-point DFT for P times on the data transformed by the third transforming unit based on the address table.

13. A data processing apparatus in super wideband digital audio encoding, comprising:
an address table unit, configured on a digital signal processor to create or store an address table;
a P-point Q times transforming unit, a fifth transforming unit, configured on a digital signal processor to perform P-point discrete Fourier transform (DFT) for Q times on the data based on the address table created or stored by the address table unit; and
a Q-point P times transforming unit, a sixth transforming unit, configured on a digital signal processor to perform Q-point DFT for P times on the data transformed by a fifth transforming unit based on the address table created or stored by the address table unit;
wherein: P and Q are coprime positive integers; the address table is $<K_1 \times n_1 + K_2 \times n_2>_M$, where M is the length of the address table and $M = P \times Q$, $n_1 = 0, \ldots, P-1$, $n_2 = 0, \ldots, Q-1$ and $K_1$ and $K_2$ are coprime positive integers that satisfy $<K_1 K_2>_M = 0$.

* * * * *